United States Patent
Kumar et al.

(10) Patent No.: US 8,926,091 B2
(45) Date of Patent: Jan. 6, 2015

(54) OPTICAL ELEMENTS WITH ALIGNMENT FACILITIES FOR OPTICAL DYES

(75) Inventors: Anil Kumar, Murrysville, PA (US);
Peter C. Foller, Murrysville, PA (US);
Jiping Shao, Monroeville, PA (US)

(73) Assignee: Transitions Optical, Inc., Pinellas Park, FL (US)

(*) Notice: Subject to any disclaimer, the term of this patent is extended or adjusted under 35 U.S.C. 154(b) by 1344 days.

(21) Appl. No.: 12/604,620

(22) Filed: Oct. 23, 2009

(65) Prior Publication Data
US 2010/0157241 A1 Jun. 24, 2010

Related U.S. Application Data

(62) Division of application No. 10/846,603, filed on May 17, 2004, now Pat. No. 7,632,540.

(60) Provisional application No. 60/484,100, filed on Jul. 1, 2003.

(51) Int. Cl.
| | | |
|---|---|---|
| *G02C 7/02* | (2006.01) |
| *G02F 1/13* | (2006.01) |
| *C09K 19/04* | (2006.01) |
| *C09K 19/20* | (2006.01) |
| *C09K 19/38* | (2006.01) |
| *C09K 19/52* | (2006.01) |
| *C09K 19/54* | (2006.01) |
| *C09K 19/60* | (2006.01) |
| *G02B 5/30* | (2006.01) |
| *G02B 5/23* | (2006.01) |

(52) U.S. Cl.
CPC ......... *C09K 19/0403* (2013.01); *C09K 19/2007* (2013.01); *C09K 19/38* (2013.01); *C09K 19/52* (2013.01); *C09K 19/54* (2013.01); *C09K 19/544* (2013.01); *C09K 19/60* (2013.01); *G02B 5/3016* (2013.01); *C09K 2019/0448* (2013.01); *C09K 2019/546* (2013.01); *G02B 5/23* (2013.01)

USPC .................. 351/159.31; 349/193

(58) Field of Classification Search
CPC ..................................... G02B 3/0031
USPC ........ 351/159.01–159.81; 349/192, 200, 165, 349/123
See application file for complete search history.

(56) References Cited

U.S. PATENT DOCUMENTS

| 2,319,826 A | 5/1943 | Land |
| 2,334,446 A | 11/1943 | Serrell |

(Continued)

FOREIGN PATENT DOCUMENTS

| EP | 0 313 941 A1 | 5/1989 |
| EP | 0 321 563 | 11/1991 |

(Continued)

OTHER PUBLICATIONS

Atassi, Yomen et al. "Reversible Photoinduced Modifications of Polymers Doped with Photochromes: Anisotropy, Photo-assisted Poling and Surface Gratings," *Mol. Cryst. Liq. Cryst.*, vol. 315 (1998), pp. 11-22.

(Continued)

*Primary Examiner* — Ricky Mack
*Assistant Examiner* — Robert E Tallman
(74) *Attorney, Agent, or Firm* — The Webb Law Firm

(57) ABSTRACT

The present invention relates to optical elements, such as but not limited to ophthalmic elements, comprising an alignment facility for an optical dye. The optical elements include a substrate; and an alignment facility for an optical dye connected to at least a portion of the substrate, where the alignment facility is an at least partial coating of an at least partially ordered liquid crystal material having at least a first general direction.

8 Claims, 1 Drawing Sheet

(56) References Cited

U.S. PATENT DOCUMENTS

| | | |
|---|---|---|
| 2,475,921 A | 7/1949 | Smith |
| 2,481,830 A | 9/1949 | Dreyer |
| 2,544,659 A | 3/1951 | Dreyer |
| 3,276,316 A | 10/1966 | Makas |
| 3,361,706 A | 1/1968 | Meriwether et al. |
| 3,653,863 A | 4/1972 | Araujo et al. |
| 4,039,254 A | 8/1977 | Harsch |
| 4,043,637 A | 8/1977 | Hovey |
| 4,049,338 A | 9/1977 | Slocum |
| 4,166,043 A | 8/1979 | Uhlmann et al. |
| 4,190,330 A | 2/1980 | Berreman |
| 4,279,474 A | 7/1981 | Belgorod |
| 4,367,170 A | 1/1983 | Uhlmann et al. |
| 4,549,894 A | 10/1985 | Araujo et al. |
| 4,556,605 A | 12/1985 | Mogami et al. |
| 4,637,896 A | 1/1987 | Shannon |
| 4,648,925 A | 3/1987 | Goepfert et al. |
| 4,683,153 A | 7/1987 | Goepfert et al. |
| 4,685,783 A | 8/1987 | Heller et al. |
| 4,728,173 A | 3/1988 | Toth |
| 4,756,605 A | 7/1988 | Okada et al. |
| 4,756,973 A | 7/1988 | Sakagami et al. |
| 4,810,433 A | 3/1989 | Takayanagi et al. |
| 4,838,673 A | 6/1989 | Richards et al. |
| 4,863,763 A | 9/1989 | Takeda et al. |
| 4,865,668 A | 9/1989 | Goepfert et al. |
| 4,873,026 A | 10/1989 | Behre et al. |
| 4,873,029 A | 10/1989 | Blum |
| 4,931,220 A | 6/1990 | Haynes et al. |
| 4,974,941 A | 12/1990 | Gibbons et al. |
| 4,977,028 A | 12/1990 | Goepfert et al. |
| 5,024,850 A | 6/1991 | Broer et al. |
| 5,067,795 A | 11/1991 | Senatore |
| 5,073,294 A | 12/1991 | Shannon et al. |
| 5,130,058 A | 7/1992 | Tanaka et al. |
| 5,130,353 A | 7/1992 | Fischer et al. |
| 5,139,707 A | 8/1992 | Gugltelmetti et al. |
| 5,155,607 A | 10/1992 | Inoue et al. |
| 5,166,345 A | 11/1992 | Akashi et al. |
| 5,180,470 A | 1/1993 | Smith et al. |
| 5,185,390 A | 2/1993 | Fischer et al. |
| 5,189,448 A | 2/1993 | Yaguchi |
| 5,200,116 A | 4/1993 | Heller |
| 5,202,053 A | 4/1993 | Shannon |
| 5,247,377 A | 9/1993 | Omeis et al. |
| 5,298,547 A | 3/1994 | Gareiss et al. |
| 5,359,085 A | 10/1994 | Iwamoto et al. |
| 5,389,287 A | 2/1995 | Nishiyama et al. |
| 5,389,698 A | 2/1995 | Chigrinov et al. |
| 5,464,669 A | 11/1995 | Kang et al. |
| 5,543,267 A | 8/1996 | Stumpe et al. |
| 5,602,661 A * | 2/1997 | Schadt et al. ............. 349/124 |
| 5,608,567 A | 3/1997 | Grupp |
| 5,641,846 A | 6/1997 | Bieringer et al. |
| 5,644,416 A | 7/1997 | Morikawa et al. |
| 5,645,767 A | 7/1997 | Van Gemert |
| 5,658,501 A | 8/1997 | Kumar et al. |
| 5,698,141 A | 12/1997 | Kumar |
| 5,723,072 A | 3/1998 | Kumar |
| 5,746,949 A | 5/1998 | Shen et al. |
| 5,846,452 A | 12/1998 | Gibbons et al. |
| 5,903,330 A | 5/1999 | Fünfschilling et al. |
| 5,943,104 A * | 8/1999 | Moddel et al. ............. 349/13 |
| 5,952,515 A | 9/1999 | Melzig et al. |
| 5,962,617 A | 10/1999 | Slagel |
| 6,022,497 A | 2/2000 | Kumar |
| 6,025,026 A | 2/2000 | Smith et al. |
| 6,036,890 A | 3/2000 | Melzig et al. |
| 6,049,428 A | 4/2000 | Khan et al. |
| 6,060,001 A | 5/2000 | Welch et al. |
| 6,067,142 A * | 5/2000 | Anderson et al. ............. 349/130 |
| 6,113,814 A | 9/2000 | Gemert et al. |
| 6,150,430 A | 11/2000 | Walters et al. |
| 6,153,126 A | 11/2000 | Kumar |
| 6,160,597 A | 12/2000 | Schadt et al. |
| 6,187,444 B1 | 2/2001 | Bowles, III et al. |
| 6,201,588 B1 * | 3/2001 | Walton et al. ............. 349/123 |
| 6,239,778 B1 | 5/2001 | Palffy-Muhoray et al. |
| 6,245,399 B1 | 6/2001 | Sahouani et al. |
| 6,268,055 B1 | 7/2001 | Walters et al. |
| 6,281,366 B1 | 8/2001 | Frigoli et al. |
| 6,284,418 B1 | 9/2001 | Trantolo |
| 6,312,811 B1 | 11/2001 | Frigoli et al. |
| 6,334,681 B1 | 1/2002 | Perrott et al. |
| 6,338,808 B1 | 1/2002 | Kawata et al. |
| 6,348,604 B1 | 2/2002 | Nelson et al. |
| 6,369,869 B2 | 4/2002 | Schadt et al. |
| 6,432,544 B1 | 8/2002 | Stewart et al. |
| 6,433,043 B1 | 8/2002 | Misura et al. |
| 6,436,525 B1 | 8/2002 | Welch et al. |
| 6,474,695 B1 | 11/2002 | Schneider et al. |
| 6,491,391 B1 * | 12/2002 | Blum et al. ............. 351/159.71 |
| 6,506,488 B1 | 1/2003 | Stewart et al. |
| 6,531,076 B2 | 3/2003 | Crano et al. |
| 6,555,028 B2 | 4/2003 | Walters et al. |
| 6,597,422 B2 | 7/2003 | Fünfschilling et al. |
| 6,602,603 B2 | 8/2003 | Welch et al. |
| 6,613,433 B2 | 9/2003 | Yamamoto et al. |
| 6,630,597 B1 | 10/2003 | Lin et al. |
| 6,641,874 B2 | 11/2003 | Kuntz et al. |
| 6,690,495 B1 | 2/2004 | Kosa et al. |
| 6,705,569 B1 | 3/2004 | Sanders et al. |
| 6,717,644 B2 | 4/2004 | Schadt et al. |
| 6,761,452 B2 | 7/2004 | Moravec et al. |
| 6,844,686 B1 | 1/2005 | Schneck et al. |
| 6,874,888 B1 | 4/2005 | Dudai |
| 2002/0039627 A1 | 4/2002 | Ichihashi et al. |
| 2002/0090516 A1 | 7/2002 | Loshak et al. |
| 2002/0167639 A1 | 11/2002 | Coates et al. |
| 2002/0180916 A1 | 12/2002 | Schadt et al. |
| 2003/0008958 A1 | 1/2003 | Momoda et al. |
| 2003/0045612 A1 | 3/2003 | Misura et al. |
| 2003/0189684 A1 | 10/2003 | Kuntz et al. |
| 2004/0046927 A1 | 3/2004 | Montgomery |
| 2004/0090570 A1 | 5/2004 | Kosa et al. |
| 2004/0125337 A1 | 7/2004 | Boulineau et al. |
| 2004/0158028 A1 | 8/2004 | Bühler |
| 2004/0223221 A1 | 11/2004 | Sugimura et al. |
| 2005/0003107 A1 | 1/2005 | Kumar et al. |
| 2005/0004361 A1 | 1/2005 | Kumar et al. |
| 2005/0012998 A1 | 1/2005 | Kumar et al. |
| 2005/0146680 A1 | 7/2005 | Muisener et al. |

FOREIGN PATENT DOCUMENTS

| | | |
|---|---|---|
| EP | 0 446 717 A2 | 1/1992 |
| EP | 0 543 678 A1 | 5/1993 |
| EP | 0 619 358 A1 | 10/1994 |
| EP | 0 397 263 B1 | 12/1994 |
| EP | 0 686 685 B1 | 12/1995 |
| EP | 0 772 069 A1 | 10/1996 |
| EP | 0 770 116 | 2/1997 |
| EP | 0 331 233 B1 | 4/1997 |
| EP | 0 488 164 A2 | 11/1999 |
| EP | 0 965 628 A1 | 12/1999 |
| EP | 1 162 482 A2 | 12/2001 |
| EP | 1 184 379 A1 | 3/2002 |
| EP | 1203967 A1 | 8/2002 |
| EP | 1 394 595 A1 | 3/2004 |
| GB | 2 169 417 A | 7/1986 |
| JP | 59 135428 A | 8/1984 |
| JP | 02-062337 A | 3/1985 |
| JP | 64-090286 A | 6/1989 |
| JP | 03 200118 A | 9/1991 |
| JP | 03 200218 A | 9/1991 |
| WO | WO 89/05464 | 6/1989 |
| WO | WO 89/11674 A1 | 11/1989 |
| WO | WO 92/01959 | 2/1992 |
| WO | WO 93/01707 | 9/1993 |
| WO | WO 96/01884 A1 | 1/1996 |
| WO | WO 97/05213 | 2/1997 |
| WO | WO 97/22894 | 6/1997 |
| WO | WO 98/19207 | 7/1998 |
| WO | WO 99/20630 | 4/1999 |

(56) References Cited

FOREIGN PATENT DOCUMENTS

| WO | WO 00/15630 | 3/2000 |
|---|---|---|
| WO | WO 00/19252 | 4/2000 |
| WO | WO 00/77559 | 12/2000 |
| WO | WO 01/02449 | 1/2001 |
| WO | WO 01/55960 A1 | 2/2001 |
| WO | WO 01/19813 A1 | 3/2001 |
| WO | WO 01/70719 A2 | 9/2001 |
| WO | WO 02/058921 | 1/2002 |
| WO | WO 02/29489 A2 | 11/2002 |
| WO | WO 03/032066 A1 | 4/2003 |
| WO | WO 03/019270 | 6/2003 |
| WO | WO 2004/041961 A1 | 5/2004 |
| WO | WO 2004/003107 A1 | 8/2004 |
| WO | WO 2005/084826 A1 | 9/2005 |
| WO | WO 2005/085912 A1 | 9/2005 |

OTHER PUBLICATIONS

Kvasnikov, E.D., Kozenkov, V.M., and Barachevskii, V.A., "Birefringence in Polyvinylcinnamate Films Induced by Polarized Light," *Doklady Akademii nauk SSSR*, vol. 237, No. 3, USSR pp. 633-636 (1977).

Kozenkov, V.M., Chigrinov, V.G., and Kwok, H.S. "Photoanisotropic Effects in Poly (Vinyl-Cinnamate) Derivatives and Their Applications," *Mol. Cryst. Liq. Cryst.*, vol. 409, pp. 251-267 (2004).

Hikmet, R.A.M and de Witz, C., "Gel Layer for Inducting Adjustable Pretilt Angles in Liquid Crystal Systems," *J. App. Phys.* vol. 70, No. 3, pp. 1265-1266 (Aug. 1991).

Schadt, Martin et al. "Surface-Induced Parallel Alignment of Liquid Crystals by Linearly Polymerized Photopolymers," *Jpn. J. Appl. Phys.* vol. 31, No. 7, pp. 2155- 2164 (Jul. 1992).

Schadt, Martin "Optics and Applications of Photo-Aligned Liquid Crystalline Surfaces," *Nonlinear Optics*, vol. 25, pp. 1-12 (2000).

Schadt, Martin "Liquid Crystal Displays and Novel Optical Thin Films Enabled by Photo-Alignment," *Mol. Cryst. Liq. Cryst.* vol. 364, pp. 151-169 (2001).

Dyadyusha, A.G. et al. "Light-Induced Planar Orientation of a Nematic Liquid Crystal on an Anisotropic Surface without Microrelief," *Ukr. Fiz. Zhurn*, (Ukraine), vol. 35, No. 5, pp. 1059-1062.

Castellano, Joseph A. "Surface Anchoring of Liquid Crystal Molecules on Various Substrates," *Mol. Cryst. Liq. Cryst.*, vol. 94, pp. 33-41 (1983).

Huang, D.D. et al. "Effect of Aligning Layer Thickness on Photo-Aligned Ferroelectric Liquid Crystal Displays," *Proceedings of the 6th Chinese Optoelectronics Symposium, Hong Kong China*, IEEE (New York), pp. 231-234 (2003).

Chigrinov, V.G. and Kozenkov, V.M., "New Results on Liquid Crystal Alignment by Photopolymerization," *Proceedings of the SPIE—The International Society for Optical Engineering*, SPIE vol. 2409 pp. 130-140 (1995).

Moia, Franco et al. "Optical LLP/LCP Devices: A New Generation of Optical Security Elements," *Proceedings of SPIE: Optical Security and Counterfeit Deterrence Techniques III*, vol. 3973, pp, 196-203, San Jose (CA), Jan. 27-28, 2000.

Moia, Franco, "New Coloured Optical Security Elements Using Rolic's LLP/LCP Technology: Devices for 1st to 3rd Level Inspection," *Proceedings of SPIE: Optical Security and Counterfeit Deterrence Techniques IV*, vol. 4677 (2002) pp. 194-202, San Jose (CA) Jan. 23-25, 2002

"Dichroic Linear Polarisers" Rolic Ltd. available at http://www.rolic.com/050application/05313content.htm, 1 page (2003).

"Cholesteric Filters and Films" Rolic Ltd. available at http://www.rolic.com/050application/05223content.htm, 2 pages (2003).

Bachels, Thomas, et al., "Novel Photo-Aligned LC-Polymer Wide View Film for TN Displays," *Eurodisplay*, (2002), pp. 183-186.

Seiberle, Hubert et al., "Invited Paper: Photo-Aligned Anisotropic Optical Thin Films," *SID 03 Digest*, Society of Information Displays (2003), pp. 1162-1165.

Kumar, Anil et al., U.S. Appl. No. 10/846,650, filed May 17, 2004.
Kumar, Anil et al., U.S. Appl. No. 10/846,629, filed May 17, 2004.
Wang, Feng et al., U.S. Appl. No. 10/903,770, filed Jul. 30, 2004.
Kumar, Anil et al, U.S. Appl. No. 10/757,267, filed Jan. 14, 2004.

* cited by examiner

OPTICAL ELEMENTS WITH ALIGNMENT FACILITIES FOR OPTICAL DYES

CROSS-REFERENCE TO RELATED APPLICATIONS

This application is a division of U.S. patent application Ser. No. 10/846,603, filed May 17, 2004 which claims the benefit of U.S. Provisional Application Ser. No. 60/484,100, filed Jul. 1, 2003, both of which are hereby specifically incorporated by reference.

STATEMENT REGARDING FEDERALLY SPONSORED RESEARCH OR DEVELOPMENT

Not applicable.

REFERENCE TO A SEQUENCE LISTING

Not applicable.

BACKGROUND

Various non-limiting embodiments disclosed herein relate to methods of making alignment facilities for optical dyes connected to at least a portion of an optical substrate. Other non-limiting embodiments related to optical elements, such as but not limited to ophthalmic elements, comprising an alignment facility for an optical dye. Still other non-limiting embodiments relate to alignment facilities for optical dyes comprising coatings or sheets of an at least partially ordered liquid crystal material.

Liquid crystal molecules, because of their structure, are capable of being ordered or aligned so as to take on a general direction. As used herein with reference to the order or alignment of a material or structure, the term "general direction" refers to the predominant arrangement or orientation of the material or structure. More specifically, because liquid crystal molecules have rod- or disc-like structures, a rigid long axis, and strong dipoles, liquid crystal molecules can be ordered or aligned by interaction with an external force or another structure such that the long axis of each of the molecules takes on an orientation that is generally parallel to a common axis. For example, if an electric or magnetic field is applied to a cell containing a disordered, fluid-mixture of liquid crystal molecules, the long axis of essentially all of the liquid crystal molecules can be ordered in a direction relative to the applied field. Once the field is removed, however, the molecules will again randomly distribute themselves in fluid-mixture.

It is also possible to align liquid crystal molecules with an oriented surface. That is, liquid crystal molecules can be applied to a surface that has been oriented, for example by rubbing, grooving, or photo-alignment methods, and subsequently aligned such that the long axis of each of the liquid crystal molecules takes on an orientation that is generally parallel to the general direction of orientation of the surface.

Aligning a liquid crystal material with an oriented surface as discussed above generally involves holding the liquid crystal material on the oriented surface at a temperature below the melting point of the liquid crystal material for some period of time to allow the liquid crystal molecules to align themselves. Although the time required for alignment depends on several factors, generally speaking, the thicker the layer of the liquid crystal material applied to the oriented surface, the longer the time required to fully align the liquid crystal material. Further, for some thick layers of liquid crystal materials, full alignment may not be achieved.

BRIEF SUMMARY OF THE DISCLOSURE

Various non-limiting embodiments disclosed herein relate to methods of making alignment facilities for an optical dye and alignment facilities made thereby. For example, one non-limiting embodiment provides a method of making an alignment facility for an optical dye on at least a portion of an ophthalmic substrate, the method comprising forming a first at least partial coating on at least a portion of the ophthalmic substrate, the first at least partial coating comprising an at least partially ordered liquid crystal material having at least a first general direction; and forming at least one additional at least partial coating on at least a portion of the first at least partial coating, the at least one additional at least partial coating comprising an at least partially ordered liquid crystal material having at least a second general direction that is generally parallel to at least the first general direction.

Another non-limiting embodiment provides a method of making an alignment facility for an optical dye on at least a portion of an optical substrate, the method comprising forming a first at least partial coating on at least a portion of the optical substrate, the first at least partial coating comprising an at least partially ordered liquid crystal material having at least a first general direction; and forming at least one additional at least partial coating on at least a portion of the first at least partial coating, the at least one additional at least partial coating comprising an at least partially ordered liquid crystal material having at least a second general direction that is generally parallel to at least the first general direction of the liquid crystal material of the first at least partial coating; wherein a sum of a thickness of the first at least partial coating and a thickness of the at least one additional at least partial coating is greater than 20 microns.

Still another non-limiting embodiment provides a method of making an alignment facility for an optical dye on at least a portion of an optical substrate comprising forming an at least partial coating on at least a portion of the optical substrate, the at least partial coating comprising an at least partially ordered liquid crystal material having at least a first general direction, wherein the at least partial coating has a thickness greater than 6 microns.

Yet another non-limiting embodiment provides a method of making an alignment facility for an optical dye comprising an at least partial coating comprising a phase-separated polymer on at least a portion of an optical substrate, the method comprising applying a phase-separating polymer system on the at least a portion of the optical substrate, the phase-separating polymer system comprising a matrix phase forming material comprising a liquid crystal material and a guest phase forming material comprising a liquid crystal material; at least partially ordering at least a portion of the matrix phase forming material and at least a portion of the guest phase forming material such that the at least partially ordered portion of the matrix phase forming material has a first general direction and the at least partially ordered portion of the guest phase forming material has a second general direction that is generally parallel to the first general direction; and causing at least a portion of the guest phase forming material to separate from at least a portion of the matrix phase forming material by at least one of polymerization induced phase separation and solvent induced phase separation.

Another non-limiting embodiment provides a method of making an alignment facility for an optical dye comprising forming a sheet comprising an at least partially ordered liquid crystal polymer having a first general direction; and an at least partially ordered liquid crystal material having a second general direction distributed within at least a portion of the at least partially ordered liquid crystal polymer, wherein the second general direction is generally parallel to the first general direction.

Still another non-limiting embodiment provides a method of making an alignment facility comprising an at least partial coating comprising an interpenetrating polymer network, the method comprising imparting an orientation facility on at least a portion of an optical substrate; applying a polymerizable composition and a liquid crystal material on the at least a portion of the orientation facility; at least partially aligning at least a portion of the liquid crystal material with at least a portion of the orientation facility; at least partially setting at least a portion of the liquid crystal material and at least partially setting at least a portion of the polymerizable composition.

Other non-limiting embodiments disclosed herein provide optical elements comprising an alignment facility for an optical dye. For example, one non-limiting embodiment provides an ophthalmic element comprising an ophthalmic substrate; and an alignment facility for an optical dye connected to at least a portion of an ophthalmic substrate, the alignment facility comprising at least one at least partial coating comprising an at least partially ordered liquid crystal material having at least a first general direction.

Another non-limiting embodiment provides an optical element comprising an optical substrate; and an alignment facility for an optical dye connected to at least a portion of an optical substrate, the alignment facility comprising an at least partial coating having a thickness greater than 6 microns and comprising an at least partially ordered liquid crystal material having at least a first general direction of an optical element.

Still another non-limiting embodiment provides an alignment facility for an optical dye comprising an at least partial coating comprising a matrix phase comprising a liquid crystal material that is at least partially ordered in at least a first general direction; and a guest phase comprising a liquid crystal material having at least a second general direction distributed within the matrix phase, wherein at least the second general direction is generally parallel to at least the first general direction.

Another non-limiting embodiment provides an optical element comprising an optical substrate; and an alignment facility comprising an at least partial coating connected to at least a portion of the optical substrate, the at least partial coating comprising a matrix phase comprising a liquid crystal material that is at least partially ordered in at least a first general direction, and a guest phase comprising a liquid crystal material having at least a second general direction distributed within the matrix phase, wherein at least the second general direction is generally parallel to at least the first general direction.

Still another non-limiting embodiment provides an optical element comprising an optical substrate; and an alignment facility for an optical dye connected to at least a portion of the optical substrate, the alignment facility comprising a sheet comprising an at least partially ordered liquid crystal polymer having at least a first general direction; and an at least partially ordered liquid crystal material having a second general direction distributed within at least a portion of the at least partially ordered liquid crystal polymer, wherein at least the second general direction is generally parallel to at least the first general direction.

Yet another non-limiting embodiment provides an optical element comprising an optical substrate; and an alignment facility for an optical dye connected to at least a portion of the optical substrate, the alignment facility comprising an at least partial coating comprising an interpenetrating polymer network comprising a polymer and an at least partially ordered liquid crystal material having at least a first general direction.

Other non-limiting embodiments disclosed herein are directed to alignment facilities for optical dyes. For example, one non-limiting embodiment provides an alignment facility for an optical dye comprising an at least partial coating comprising a matrix phase comprising a liquid crystal material that is at least partially ordered in at least a first general direction; and a guest phase comprising a liquid crystal material having at least a second general direction distributed within the matrix phase, wherein at least the second general direction is generally parallel to at least the first general direction.

Another non-limiting embodiment provides an alignment facility for an optical dye comprising a sheet comprising an at least partially ordered liquid crystal polymer having at least a first general direction; and an at least partially ordered liquid crystal material having at least a second general direction distributed within at least a portion of the at least partially ordered liquid crystal polymer, wherein at least the second general direction is generally parallel to at least the first general direction.

Still another non-limiting embodiment provides an alignment facility for an optical dye comprising an at least partial coating comprising interpenetrating polymer network comprising a polymer and an at least partially ordered liquid crystal material having at least a first general direction.

BRIEF DESCRIPTION OF THE SEVERAL VIEWS OF THE DRAWING(S)

Various non-limiting embodiments disclosed herein will be better understood when read in conjunction with the drawings, in which.

DETAILED DESCRIPTION

Figure 1:
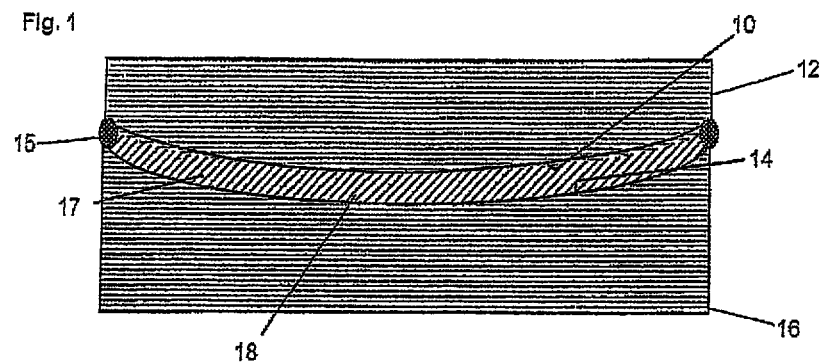
FIG. 1 is a schematic, cross-sectional view of an overmolding assembly according to one non-limiting embodiment disclosed herein.

As used in this specification and the appended claims, the articles "a," "an," and "the" include plural referents unless expressly and unequivocally limited to one referent.

Additionally, for the purposes of this specification, unless otherwise indicated, all numbers expressing quantities of ingredients, reaction conditions, and other properties or parameters used in the specification are to be understood as being modified in all instances by the term "about." Accordingly, unless otherwise indicated, it should be understood that the numerical parameters set forth in the following specification and attached claims are approximations. At the very least, and not as an attempt to limit the application of the doctrine of equivalents to the scope of the claims, numerical parameters should be read in light of the number of reported significant digits and the application of ordinary rounding techniques.

Further, while the numerical ranges and parameters setting forth the broad scope of the invention are approximations as discussed above, the numerical values set forth in the Examples section are reported as precisely as possible. It should be understood, however, that such numerical values inherently contain certain errors resulting from the measurement equipment and/or measurement technique.

Various non-limiting embodiments disclosed herein are directed toward methods of making alignment facilities for optical dyes using one or more liquid crystal materials. As used herein the term "optical dye" means a dye that can affect one or more optical properties of an object to which it is connected. For example, although not limiting herein, an optical dye can affect one or more of the color, polarization, UV-absorption, and emission (e.g., fluorescence and phosphorescence) properties of the coating or substrate to which it is connected. Optical dyes that are useful in conjunction with the various non-limiting embodiments disclosed herein include a wide variety of organic dyes, inorganic dyes, and mixtures thereof. Non-limiting examples of optical dyes include fixed-tint dyes, as well as dichroic and/or photochromic dyes.

As used herein the term "alignment facility" means a structure that can facilitate the positioning of one or more other structures or materials that are exposed, directly or indirectly, to at least a portion of the facility. Thus, the alignment facilities according to various non-limiting embodiments disclosed herein can be used to facilitate the positioning of an optical dye. More specifically, the optical dye can be aligned by direct and/or indirect interaction with the alignment facility. As used herein the term "align" means bring into suitable arrangement or position by interaction with another material, compound or structure. For example, although not limiting herein, the alignment facilities according to various non-limiting embodiments disclosed herein can directly facilitate the positioning of an optical dye that is in direct contact with the alignment facility. Alternatively, the alignment facility can indirectly facilitate the positioning of an optical dye by facilitating the positioning of another structure or material, for example and without limitation, a coating of a liquid crystal material with which the optical dye is in contact.

While not limiting herein, the alignment facilities according to various non-limiting embodiments disclosed herein can directly and/or indirectly facilitate the positioning of an optical dye that is optically anisotropic. As used herein the term "anisotropic" means having at least one property that differs in value when measured in at least one different direction. Thus, optically anisotropic dyes have at least one optical property that differs in value when measured in at least one different direction. One non-limiting example of an optically anisotropic dye is a dichroic dye. As used herein the term "dichroic" means capable absorbing one of two orthogonal plane polarized components of at least transmitted radiation more strongly than the other. As used herein, the terms "linearly polarize" or "linearly polarization" mean to confine the vibrations of the electric vector of light waves to one direction. Accordingly, dichroic dyes are capable of absorbing one of two orthogonal plane polarized components of transmitted radiation more strongly than the other, thereby resulting in linear polarization of the transmitted radiation. However, while dichroic dyes are capable of preferentially absorbing one of two orthogonal plane polarized components of transmitted radiation, if the molecules of the dichroic dye are not aligned, no net linear polarization of transmitted radiation will be achieved. That is, due to the random positioning of the molecules of the dichroic dye, selective absorption by the individual molecules can cancel each other such that no net or overall linear polarizing effect is achieved. Thus, it is generally necessary to align the molecules of the dichroic dye in order to achieve a net linear polarization. The alignment facilities according to various non-limiting embodiments disclosed herein can be used to facilitate the positioning of an optically anisotropic dye, such as a dichroic dye, thereby achieving a desired optical property or effect.

Further, various non-limiting embodiments disclosed herein provide methods of making an alignment facility for an optical dye on at least a portion of an optical substrate, such as, but not limited to, an ophthalmic substrate. As used herein the term "optical" means pertaining to or associated with Light and/or vision. As used herein the term "ophthalmic" means pertaining to or associated with the eye and vision. Non-limiting examples of optical substrates that can be used in conjunction with various non-limiting embodiments disclosed herein include ophthalmic substrates, and substrates for use in optical elements and devices. Examples of optical elements and devices include, but are not limited to, ophthalmic optical displays, windows, and mirrors. As used herein the term "display" means the visible or machine-readable representation of information in words, numbers, symbols, designs or drawings. As used herein the term "window" means an aperture adapted to permit the transmission of radiation therethrough. Non-limiting examples of windows include automotive and aircraft transparencies, filters, shutters, and optical switches. As used herein the term "mirror" means a surface that specularly reflects a large fraction of incident light.

Non-limiting examples of ophthalmic elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors. Further non-limiting examples of ophthalmic substrates include lenses, partially formed lenses, and lens blanks.

Non-limiting examples of organic materials suitable for use in forming ophthalmic substrates according to various non-limiting embodiments disclosed herein include, but are not limited to, the art-recognized polymers that are useful as ophthalmic substrates, e.g., organic optical resins that are used to prepare optically clear castings for optical applications, such as ophthalmic lenses. Specific, non-limiting examples of organic materials that may be used to form the ophthalmic substrates disclosed herein include polymeric materials, for examples, homopolymers and copolymers, prepared from the monomers and mixtures of monomers disclosed in U.S. Pat. No. 5,962,617 and in U.S. Pat. No. 5,658,501 from column 15, line 28 to column 16, line 17, the disclosures of which U.S. patents are specifically incorporated herein by reference. For example, such polymeric materials can be thermoplastic or thermoset polymeric materials, can be transparent or optically clear, and can have any refractive index required. Non-limiting examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea urethane) polymers, which are prepared, for example, by the reaction of a polyurethane prepolymer and a diamine curing agent, a composition of one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol)bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating polymer network products.

Still further, the substrates according to various non-limiting embodiments disclosed herein can be untinted, tinted, linearly polarizing, photochromic, or tinted-photochromic substrates. As used herein with reference to substrates the term "untinted" means substrates that are essentially free of coloring agent additions (such as, but not limited to, conventional dyes) and have an absorption spectrum for visible radiation that does not vary significantly in response to actinic radiation. Further, as used herein with reference to substrates, the term "tinted" means substrates that have a coloring agent addition (such as, but not limited to, conventional dyes) and an absorption spectrum for visible radiation that does not vary significantly in response to actinic radiation. As used herein the term "linearly polarizing" with reference to substrates refers to substrates that are adapted to linearly polarize radiation.

As used herein with the term "photochromic" with reference to substrates refers to substrates having an absorption spectrum for visible radiation that varies in response to at least actinic radiation. As used herein the term "actinic radiation" means electromagnetic radiation that is capable of causing a response. Actinic radiation includes, for example and without limitation, visible and ultraviolet radiation. Further, as used herein with reference to substrates, the term "tinted-photochromic" means substrates containing a coloring agent addition as well as a photochromic material, and having an absorption spectrum for visible radiation that varies in response to at least actinic radiation. Thus for example, in one non-limiting embodiment, the tinted-photochromic substrate can have a first color characteristic of the coloring agent and a second color characteristic of the combination of the coloring agent the photochromic material when exposed to actinic radiation.

Various non-limiting embodiments of methods of making alignment facilities for optical dyes will now be described. One non-limiting embodiment provides a method of making an alignment facility for an optical dye on at least a portion of an ophthalmic substrate, the method comprising forming a first at least partial coating comprising an at least partially ordered liquid crystal material having at least a first general direction on at least a portion of the ophthalmic substrate, and thereafter forming at least one additional at least partial coating comprising an at least partially ordered liquid crystal material on at least a portion of the first at least partial coating. Further, according to this non-limiting embodiment, the at least partially ordered portion of the liquid crystal material of the at least one additional at least partial coating can have at least a second general direction that is generally parallel to the first general direction of the first at least partial coating. As previously discussed, as used herein with reference to order or alignment of a material or structure, the term "general direction" refers to the predominant arrangement or orientation of the material, compound or structure. Further, it will be appreciated by those skilled in the art that a material or a structure can have a general direction even though there is some variation within the arrangement of the material or structure, provided that the material or structure has at least one predominate arrangement. Further, as used herein with reference to the general direction of the liquid crystal materials, the terms "first" and "second" are not intended as ordinal numbers or to indicate a chorological order, but instead are used for clarity in referring to various general directions herein.

As discussed above, according to various non-limiting embodiments disclosed herein, the at least partially ordered liquid crystal material of the first at least partial coating can have at least a first general direction. That is, the at least partially ordered liquid crystal material can have one predominate direction throughout the material, or it can have different regions having different general directions. For example, the at least partially ordered liquid crystal material of the first at least partial coating can have a first region having a first general direction, and a second region adjacent the first region having a second general direction that is different from the first general direction. Further, the at least partially ordered liquid crystal material of the first at least partial coating can have a plurality of regions, wherein each region has a general direction that is the same or different from the remaining regions and that together form a pattern or design. As discussed herein below in more detail, the at least one additional at least partial coating can also have a plurality of regions having general directions that are generally parallel to the general directions of the first at least partial coating and that together form essentially the same pattern or design as that of the first at least partial coating.

As used herein the term "coating" means a supported film derived from a flowable composition, which may or may not have a uniform thickness. Further, as used herein the term coating specifically excludes polymeric sheets. As used herein the term "sheet" means a pre-formed film having a generally uniform thickness and capable of self-support. As used herein the term "on" means directly connected to an object (such as, but not limited to, a substrate or a coating) or indirectly connected to an object through one or more other coatings, sheets or other structures.

More specifically, according to various non-limiting embodiments, forming the first at least partial coating can comprise applying a liquid crystal material on at least a portion of the ophthalmic substrate, at least partially ordering at least a portion of the liquid crystal material such that the at least partially ordered portion of the liquid crystal material has at least a first general direction, and at least partially setting at least a portion of the at least partially ordered liquid crystal material.

Suitable methods of applying liquid crystal materials to at least a portion of a substrate according to various non-limiting embodiments disclosed herein include, without limitation: spin coating, spray coating, spray and spin coating, curtain coating, flow coating, dip coating, injection molding, casting, roll coating, wire coating, overlaying, and combinations thereof. For example, although not limiting herein, in one specific non-limiting embodiment, liquid crystal material of the first at least partial coating can be applied to at least a portion of the ophthalmic substrate by spin coating, and thereafter at least partially ordered.

As used herein the term "order" means bring into a suitable arrangement or position, such as by aligning with another structure or material, or by some other force or effect. Thus, as used herein the term "order" encompasses both contact methods of ordering a material, such as aligning with another structure or material, and non-contact methods of ordering a material, such as by exposure to an external force or effect. The term "order" also encompasses combinations of contact and non-contact methods.

Non-limiting examples of methods of at least partially ordering liquid crystal materials according to various non-limiting embodiments disclosed herein include exposing the at least a portion of the liquid crystal material to at least one of: a magnetic field, an electric field, linearly polarized infrared radiation, linearly polarized ultraviolet radiation, linearly polarized visible radiation and a shear force. In addition to the aforementioned methods of at least partially ordering a liquid crystal material, as discussed in more detail below, the liquid crystal materials according to various non-limiting embodiments disclosed herein can be at least partially ordered by aligning the at least a portion of the liquid crystal material with another material or structure, such as an orientation facility.

In one non-limiting embodiment, the liquid crystal material of the first at least partial coating is at least partially ordered by exposing at least a portion of the liquid crystal material to a shear force. For example, although not limiting herein, according to this non-limiting embodiment an optical or ophthalmic substrate with the liquid crystal material on at least a portion of its surface can be placed in a centrifuge and the centrifuge can be rotated such that the substrate traverses the perimeter of the centrifuge and that the liquid crystal material flows relative to the surface of the substrate.

Additionally, according to various non-limiting embodiments disclosed herein, at least partially ordering at least a portion of the liquid crystal material of the first at least partial coating can occur at essentially the same time as applying the liquid crystal material to at least portion of the substrate, or it can occur after applying the liquid crystal material to the substrate. For example, in one non-limiting embodiment wherein applying the liquid crystal material and at least partially ordering at least a portion of the liquid crystal material occur at essentially the same time, the liquid crystal material can be applied to at least a portion of at least one surface of the ophthalmic substrate using an application technique that can introduce a shear force to at least a portion of the liquid crystal material, thereby ordering the long axis of the molecules of the liquid crystal material in a general direction that is generally parallel to the direction of the shear force during application. For example, although not limiting herein, the liquid crystal material of the first at least partial coating can be curtain coated onto at least a portion of at least one surface of the ophthalmic substrate such that shear force are introduced to the liquid crystal material due to the relative movement of the surface of the ophthalmic substrate with respect to the liquid crystal material being applied. The shear force can cause at least a portion of the molecules of the liquid crystal material to be ordered such that the long axis of the liquid crystal molecules have a general direction that is generally parallel to the direction of the movement of the ophthalmic substrate.

In another non-limiting embodiment wherein applying the liquid crystal material of the first at least partial coating occurs before at least partially ordering at least a portion of the liquid crystal material, the liquid crystal material can be applied, for example, by spin coating, and, thereafter, the liquid crystal material can be at least partially ordered. For example the liquid crystal material can be at least partially ordered by exposing at least a portion of the liquid crystal material to a magnetic field, an electric field, linearly polarized infrared radiation, linearly polarized ultraviolet radiation, linearly polarized visible radiation and/or a shear force. Additionally or alternatively, at least a portion of the liquid crystal material can be at least partially ordered by alignment with at least a portion of an orientation facility, as discussed in more detail herein below.

As discussed above, after at least a portion of the liquid crystal material of the first at least partial coating is at least partially ordered, the at least partially ordered liquid crystal material is at least partially set. As used herein the term "set" means to fix the liquid crystal material in a desired orientation. Non-limiting examples of methods of at least partially setting liquid crystal materials include at least partially drying a solvent from the liquid crystal material, and at least partially curing the liquid crystal material, for example by at least partially cross-linking the liquid crystal material and/or at least partially polymerizing the liquid crystal material. Non-limiting methods of at least partially polymerizing a liquid crystal material include photo-induced polymerization, thermally-induced polymerization, and combinations thereof. Further, photo-induced polymerization includes, but is not limited to, polymerization induced by ultraviolet light, polymerization induced by visible light, and combinations thereof.

Generally the thickness of the first at least partial coating can be any thickness necessary to achieve the total desired thickness of the alignment facility when added together with the thickness of the additional at least partial coating(s), which are described below in more detail. For example and without limitation, according to various non-limiting embodiments, the first at least partial coating can have a thickness ranging from: 0.5 to 20 microns, 0.5 to 10 microns, and 2 to 8 microns. Further, although not limiting herein, according to certain non-limiting embodiments, the thickness of the first at least partial coating can be less than that of the at least one additional at least partial coating.

As discussed above, according to various non-limiting embodiments disclosed herein, after forming the first at least partial coating, at least one additional at least partial coating comprising a liquid crystal material is formed on at least a portion of the first at least partial coating. More particularly, according to various non-limiting embodiments disclosed herein, forming the at least one additional at least partial coating can comprise applying a liquid crystal material to at least a portion of the first at least partial coating; at least partially ordering at least a portion of the liquid crystal material such that the at least partially ordered portion of the liquid crystal material has at least a second general direction that is generally parallel to at least the first general direction of the liquid crystal material of the first at least partial coating; and at least partially setting at least a portion of the liquid crystal material. Non-limiting methods of applying and at least partially setting the liquid crystal material of the at least one additional at least partial coating are set forth above in detail with respect to the first at least partial coating.

As previously discussed, liquid crystal materials are generally capable of being aligned with one or more other structures or materials such that the long axis of the molecules of the liquid crystal material take on a general direction that is generally parallel to the general direction of the structure with which the molecules are aligned. More specifically, although not limiting herein, according various non-limiting embodiments disclosed herein, the liquid crystal material of the at least one additional at least partial coating can be at least partially ordered by aligning at least a portion of the liquid crystal material with at least a portion of the at least partially ordered liquid crystal material of the first at least partial coating such that the long axis of the molecules of the liquid crystal material of the at least one additional at least partial coating are generally parallel to at least the first general direction of the at least partially ordered liquid crystal material of the first at least partial coating. Thus, in this manner, the general direction of the liquid crystal material of the first at least partial coating can be transferred to the liquid crystal material of the at least one additional at least partially coating. Further, if the liquid crystal material of the first at least partial coating comprises a plurality of regions having general directions that together form a design or pattern (as previously described), that design or pattern can be transferred to the liquid crystal material of the at least one additional at least partial coating by aligning the liquid crystal material of the at least one additional at least partial coating with liquid crystal material of the first at least partial coating. Additionally, although not required, according to various non-limiting embodiments disclosed herein the at least one additional at least partial coating can be exposed to at least one of: a magnetic field, an electric field, linearly polarized infrared radiation, linearly polarized ultraviolet radiation, and linearly polarized visible radiation while being at least partially aligned with at least a portion of the liquid crystal material of the first at least partial coating.

As discussed above with respect to the first at least partial coating, according to various non-limiting embodiments, the at least one additional at least partial coating can have any thickness necessary to achieve the desired overall thickness of the alignment facility. Thus, for example and without limitation, according to various non-limiting embodiments disclosed herein, the at least one additional at least partial coating can have a thickness ranging from 1 micron to 25 microns, and can further have a thickness ranging from 5 microns to 20 microns. According to still another non-limiting embodiment, at least one additional at least partial coating can have a thickness greater than 6 microns, and can further have a thickness of at least 10 microns.

As previously discussed, the time required to fully align thick layer of a liquid crystal material with an oriented surface can be substantial. Further, in some instances, only a portion of the liquid crystal material immediately adjacent oriented surface may be aligned. Thus, according to various non-limiting embodiments wherein thicker alignment facilities are desired, the alignment facilities can comprise a plurality of additional at least partial coatings, each having an independently selected thickness that, when added together with the thickness of the first at least partial coating, form an alignment facility having the desired overall thickness. More specifically, according to various non-limiting embodiments disclosed herein, the method of forming the alignment facility can comprise forming a first at least partial coating comprising a liquid crystal material (as previously described), and thereafter successively forming a plurality of additional at least partial coatings. That is, after forming the first at least partial coating, a plurality of additional at least partial coatings can be formed by successively applying a liquid crystal material to at least a portion of a preceding coating, at least partially ordering at least a portion of the liquid crystal material such that the at least partially ordered portion of the liquid crystal material has at least one general direction that is generally parallel to a general direction of the preceding coating, and at least partially setting at least a portion of the liquid crystal material. Further, each of the at least partial coatings can have an independently selected thickness. For example and without limitation, each of the additional at least partial coatings can have a thickness ranging from 1 micron to 25 microns, and can further have a thickness ranging from 5 microns to 20 microns. According to another non-limiting embodiment, each of the additional at least partial coatings can have a thickness greater than 6 microns, and can further have a thickness of at least 10 microns.

According to one non-limiting embodiment, forming a plurality of additional at least partial coatings can comprise successively forming at least two additional at least partial coatings. In another non-limiting embodiment, forming a plurality of additional at least partial coatings can comprises successively forming at least three additional at least partial coatings. Although according to these non-limiting embodiments each of the plurality of additional at least partial coatings is formed in succession, according to various non-limiting embodiments, the time required to successively form the plurality of coatings can be less than the time required to apply and align a single coating of the same liquid crystal material having the same thickness as the plurality of coatings.

Further, as discussed above, it is possible to 'transfer' a general direction (or plurality of general directions that can together form a pattern or design) from one coating to the next by at least partially aligning each successive coating with at least a portion of the immediately preceding coating. For example, although not limiting herein, if the first at least partial coating comprises a plurality of regions having a plurality of general directions that together form a design, that design can be transferred to the at least one additional coating by alignment of the at least one additional at least partial coating with the first at least partial coating as discussed above. Further, where the alignment facility comprises a plurality of additional at least partial coatings, the design can be transferred to each of the additional at least partial coatings by successively aligning each coating with the preceding coating.

As previously discussed, the thickness of the first at least partial coating and the thickness and number of additional at least partial coatings, can be chosen so as to achieve the desired overall thickness of the alignment facility. Although not limiting herein, according to one non-limiting embodiment, the sum of the thickness of the first at least partial coating and the thickness of the at least one additional at least partial coating can range from 10 microns to 50 microns. According to another non-limiting embodiment, the sum of the thickness of the first at least partial coating and the at least one additional at least partial coating can range from 20 microns to 40 microns. According to still another non-limiting embodiment, this sum can be greater than 20 microns, and further can be at least 22 microns.

Another non-limiting embodiment provides a method of making an alignment facility for an optical dye on at least a portion of an optical substrate, the method comprising forming a first at least partial coating comprising an at least partially ordered liquid crystal material having at least a first general direction on at least a portion of the optical substrate, and forming at least one additional at least partial coating comprising an at least partially ordered liquid crystal material having at least a second general direction that is generally parallel to at least the first general direction of the liquid crystal material of the first at least partial coating on at least a portion of the first at least partial coating; wherein a sum of a thickness of the first at least partial coating and a thickness of the at least one additional at least partial coating is greater than 20 microns.

Still another non-limiting embodiment provides a method of making an alignment facility for an optical dye on at least a portion of an optical substrate, the method comprising forming an at least partial coating comprising an at least partially ordered liquid crystal material having at least a first general direction on at least a portion of the optical substrate, the at least partial coating having a thickness of at least 6 microns. According to this non-limiting embodiment, forming the at least partial coating can comprise applying a liquid crystal material to at least a portion of the optical substrate such that the liquid crystal material has a thickness of greater than 6 microns, at least partially ordering at least a portion of the liquid crystal material such that at least a portion of the at least partially ordered liquid crystal material has at least a first general direction, and at least partially setting at least a portion of the at least partially ordered liquid crystal material. Although not limiting herein, according to this non-limiting embodiment, the at least partial coating can have thickness of at least 10 microns, and further can have a thickness ranging from 50 to 1000 microns.

As previous mentioned, ordering a liquid crystal material by aligning the liquid crystal material with another structure having an oriented surface can take a substantial amount of time and/or can result in alignment of only certain portions of the liquid crystal material adjacent the oriented surface. However, the inventors have observed that by using certain non-contact methods of ordering, or combinations of contact and non-contact methods of ordering, faster and/or more complete ordering liquid crystal materials can result. Thus, according to the above-mentioned non-limiting embodiment, although not required, at least partially ordering at least a portion of the liquid crystal material can comprise at least one of exposing at least a portion of the liquid crystal material to a magnetic field or an electric field. Additionally, according to this non-limiting embodiment, ordering at least a portion of the liquid crystal material can comprise exposing at least a portion of the liquid crystal material to a magnetic field or an electric field while aligning the at least a portion of the liquid crystal material with another structure, such as, but not limited to a coating of an least partially ordered liquid crystal material or an orientation facility. Non-limiting examples of orientation facilities are described below in more detail.

For example, according to one specific non-limiting embodiment forming the at least partial coating can comprise applying a solution or mixture of a liquid crystal polymer in a solvent or carrier to at least a portion of the optical substrate such that the liquid crystal polymer has a thickness of greater than 6 microns. Thereafter, according to this non-limiting embodiment, at least a portion of the liquid crystal polymer can be at least partially ordered by exposing the at least a portion of the liquid crystal polymer to at least one of a magnetic field and an electric field. Further, at least a portion of the liquid crystal polymer can be at least partially ordered by exposing the portion to at least one of a magnetic field and an electric field while aligning the at least a portion with another structure. After at least partially ordering at least a portion of the liquid crystal polymer, at least a portion of the liquid crystal polymer can be at least partially setting, for example by drying at least a portion of the liquid crystal polymer as discussed above.

Referring now to FIG. 1, one non-limiting embodiment provides a method of making an alignment facility comprising an at least partial coating comprising an at least partially ordered liquid crystal material having at least a first general direction on at least a portion of an optical substrate by placing at least portion of a surface 10 of an optical substrate 12 adjacent a surface 14 of a transparent mold 16 to define a molding region 17. The surface 14 of transparent mold 16 can be concave or spherically negative, or it can have any other configuration as desired or required. Further, although not required, a gasket or spacer 15 can be placed between optical substrate 12 and transparent mold 16 to provide a desired offset and/or contain the liquid crystal material. After positioning the optical substrate 12, a liquid crystal material 18 can be introduced into the molding region 17 defined by the surface 10 of the optical substrate 12 and the surface 14 of the transparent mold 16, such that at least a portion of the liquid crystal material 18 is caused to flow therebetween. Thereafter, at least a portion of the liquid crystal material 18 can be at least partially ordered, for example, by exposure to an electric field, a magnetic field, linearly polarized infrared radiation, linearly polarized ultraviolet radiation, and/or linearly polarized visible radiation and at least partially polymerized. After polymerization, the optical substrate with the at least partial coating of an at least partially ordered liquid crystal material connected to at least a portion of a surface thereof can be released from the mold.

Alternatively, the liquid crystal material 18 can be introduced onto surface 14 of transparent mold 16 prior to placing at least a portion of surface 10 of the optical substrate 12 adjacent thereto such that at least a portion of surface 10 contacts at least a portion of the liquid crystal material 18, thereby causing the liquid crystal material 18 to flow between surface 10 and surface 14. Thereafter, the liquid crystal material 18 can be at least partially ordered and polymerized as discussed above. After polymerization, the optical substrate 12 with the at least partial coating of liquid crystal material 18 connected thereto can be released from the mold.

Although not shown in FIG. 1, additionally or alternatively, an orientation facility having at least a first general direction can be imparted onto at least a portion of the surface of the transparent mold prior to introducing the liquid crystal material into the mold and/or onto at least a portion of the surface of the optical substrate prior to contacting the surface of the optical substrate with the liquid crystal material. Further, according to this non-limiting embodiment, at feast partially ordering at least a portion of the liquid crystal material can comprise at least partially aligning at least a portion of the liquid crystal material with at least a portion of the orientation facility on the surface of the mold and/or at least a portion of the orientation facility on the surface of the optical substrate. Additionally, as discussed above, at least a portion of the liquid crystal material of the at least partial coating can be exposed to a magnetic field, an electric field, linearly polarized infrared radiation, linearly polarized ultraviolet radiation and/or linearly polarized visible radiation during alignment to facilitate the processes.

Although not limiting herein, it is contemplated that the aforementioned overmolding methods of making at least partial coatings can be particularly useful in forming coatings on multi-focal ophthalmic lenses, or for forming at least partial coatings for other applications where relatively thick alignment facilities are desired.

Non-limiting examples of liquid crystal materials suitable for use in the alignment facilities according to various non-limiting embodiments disclosed herein include liquid crystal polymers, liquid crystal pre-polymers, liquid crystal monomers, and liquid crystal mesogens. For example, according to one non-limiting embodiment, the liquid crystal materials of the first at least partial coating and the at least one additional at least partial coating can be independently chosen from liquid crystal polymers, liquid crystal pre-polymers, liquid crystal monomers, and liquid crystal mesogens. As used herein the term "pre-polymer" means partially polymerized materials.

Liquid crystal monomers that are suitable for use in conjunction with various non-limiting embodiments disclosed herein include mono- as well as multi-functional liquid crystal monomers. Further, according to various non-limiting embodiments disclosed herein, the liquid crystal monomer can be a cross-linkable liquid crystal monomer, and can further be a photocross-linkable liquid crystal monomer. As used herein the term "photocross-linkable" means a material, such as a monomer, a pre-polymer or a polymer, that can be cross-linked on exposure to actinic radiation. For example, photo-cross-linkable liquid crystal monomers include those liquid crystal monomers that are cross-linkable on exposure to ultraviolet radiation and/or visible radiation, either with or without the use of polymerization initiators.

Non-limiting examples of cross-linkable liquid crystal monomers suitable for use in accordance with various non-limiting embodiments disclosed herein include liquid crystal monomers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers and blends thereof. Non-limiting examples of photocross-linkable liquid crystal monomers suitable for use in the at least partial coatings of the alignment facilities according to various non-limiting embodiments disclosed herein include liquid crystal monomers having functional groups chosen from acrylates, methacrylates, alkynes, epoxides, thiols, and blends thereof.

Liquid crystal polymers and pre-polymers that are suitable for use in conjunction with various non-limiting embodiments disclosed herein include main-chain liquid crystal polymers and pre-polymers and side-chain liquid crystal polymers and pre-polymers. In main-chain liquid crystal polymers and pre-polymers, rod- or disc-like groups and/or liquid crystal mesogens are primarily located within polymer backbone. In side-chain polymers and pre-polymers, the rod- or disc-like groups and/or liquid crystal mesogens primarily are located within the side chains of the polymer. Additionally, according to various non-limiting embodiments disclosed herein, the liquid crystal polymer or pre-polymer can be cross-linkable, and further can be photocross-linkable.

Non-limiting examples of liquid crystal polymers and pre-polymers that are suitable for use in accordance with various non-limiting embodiments disclosed herein include, but are not limited to, main-chain and side-chain polymers and pre-polymers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers, and blends thereof. Non-limiting examples of photocross-linkable liquid crystal polymers and pre-polymers that are suitable for use in the at least partial coatings of the alignment facilities according to various non-limiting embodiments disclosed herein include those polymers and pre-polymers having functional groups chosen from acrylates, methacrylates, alkynes, epoxides, thiols, and blends thereof.

Liquid crystals mesogens that are suitable for use in conjunction with various non-limiting embodiments disclosed herein include thermotropic liquid crystal mesogens and lyotropic liquid crystal mesogens. Further, non-limiting examples of liquid crystal mesogens that are suitable for use in conjunction with various non-limiting embodiments disclosed herein include columatic (or rod-like) liquid crystal mesogens and discotic (or disc-like) liquid crystal mesogens.

Further, although not limiting herein, the methods of making alignment facilities according to various non-limiting embodiments disclosed herein can further comprise forming an at least partial primer coating on at least a portion of the optical substrate prior to applying any of the various at least partial coatings comprising a liquid crystal material thereto to facilitate one or more of adhesion and wetting of at least a portion of the optical substrate by the liquid crystal material. Non-limiting examples of primer coatings that can be used in conjunction with various non-limiting embodiments disclosed herein include coatings comprising coupling agents, at least partial hydrolysates of coupling agents, and mixtures thereof. As used herein "coupling agent" is means a material having at least one group capable of reacting, binding and/or associating with a group on at least one surface. In one non-limiting embodiment, a coupling agent can serve as a molecular bridge at the interface of at least two surfaces that can be similar or dissimilar surfaces. Although not limiting herein, coupling agents, can be monomers, oligomers, pre-polymers and/or polymers. Such materials include, but are not limited to, organo-metallics such as silanes, titanates, zirconates, aluminates, zirconium aluminates, hydrolysates thereof and mixtures thereof. As used herein the phrase "at least partial hydrolysates of coupling agents" means that at least some to all of the hydrolyzable groups on the coupling agent are hydrolyzed. In addition to coupling agents and/or hydrolysates of coupling agents, the primer coatings can comprise other adhesion enhancing ingredients. For example, although not limiting herein, the primer coating can further comprise an adhesion-enhancing amount of an epoxy-containing material. Adhesion-enhancing amounts of an epoxy-containing materials when added to the coupling agent containing coating composition can improve the adhesion of a subsequently applied coating as compared to a coupling agent containing coating composition that is essentially free of the epoxy-containing material. Other non-limiting examples of primer coatings that are suitable for use in conjunction with the various non-limiting embodiments disclosed herein include those described U.S. Pat. No. 6,602,603 and U.S. Pat. No. 6,150,430, which are hereby specifically incorporated by reference. Further, according to one non-limiting embodiment, the primer coating can serve as a barrier coating to prevent interaction of the coating ingredients with the substrate surface and vice versa.

Another non-limiting embodiment of a method of making an alignment facility for an optical dye on at least a portion of an ophthalmic substrate comprises imparting an orientation facility having at least one general direction to at least portion of the ophthalmic substrate, forming a first at least partial coating comprising an at least partially ordered liquid crystal material having at least a first general direction that is generally parallel to at least one general direction of the orientation facility on at least a portion of the orientation facility, and thereafter forming at least one additional at least partial coating comprising an at least partially ordered crystal material having at least a second general direction that is generally parallel to at least the first general direction of the first at least partial coating on at least a portion of the first at least partial coating. Suitable non-limiting methods of forming at least partial coating comprising a liquid crystal material, as well as suitable non-limiting examples of liquid crystal materials that can be used to form such coatings, are set forth above.

As used herein the term "orientation facility" means a mechanism that can facilitate the positioning of one or more other structures that are exposed, directly and/or indirectly, to at least a portion of the orientation facility. Although not required, as discussed above with respect to the various at least partial coatings comprising liquid crystal materials, the orientation facilities according to various non-limiting embodiments disclosed herein can comprise a first ordered region having a first general direction and at least one second ordered region adjacent the first ordered region having an second general direction that is different from the first general direction. Further, the orientation facilities can have a plurality of regions, each of which has a general direction that is the same or different from the remaining regions, so as to form a desired pattern or design. Additionally, the orientation facilities can comprise one or more different types of orientation facilities.

Non-limiting examples of orientation facilities that can be used in conjunction with various other non-limiting embodiments disclosed herein include at least partial coatings comprising an at least partially ordered alignment medium, at least partially ordered polymer sheets, at least partially treated surfaces, Langmuir-Blodgett films, and combinations thereof.

For example, although not limiting herein, according to various non-limiting embodiments wherein the orientation facility comprises an at least partial coating comprising an at least partially ordered alignment medium, imparting the orientation facility can comprise applying an alignment medium to at least a portion of the optical substrate and at least partially ordering the alignment medium. Non-limiting methods of ordering at least a portion of the alignment medium include those methods of ordering the at least partial coating comprising a liquid crystal material described above. For example, although not limiting herein, in one non-limiting embodiment, the alignment medium can be at least partially ordered by exposure to at least one of: a magnetic field, an electric field, linearly polarized infrared radiation, linearly polarized ultraviolet radiation, linearly polarized visible radiation and a shear force. Additionally, when the alignment medium is a photo-orientation material (discussed below), the alignment medium can be ordered using linearly polarized ultraviolet radiation. Non-limiting examples of suitable alignment media that can be used in conjunction with various non-limiting embodiments disclosed herein include photo-orientation materials, and rubbed-orientation materials.

Non-limiting examples of photo-orientation materials that are suitable for use as an alignment medium in conjunction with various non-limiting embodiments disclosed include photo-orientable polymer networks. Specific, non-limiting examples of suitable photo-orientable polymer networks include azobenzene derivatives, cinnamic acid derivatives, coumarine derivatives, ferulic acid derivatives, and polyimides. For example, according one non-limiting embodiment, the orientation facility can comprise at least one at least partial coating comprising an at least partially ordered photo-orientable polymer network chosen from azobenzene derivatives, cinnamic acid derivatives, coumarine derivatives, ferulic acid derivatives, and polyimides. Specific non-limiting examples of cinnamic acid derivatives that can be used as an alignment medium in conjunction with various non-limiting embodiments disclosed herein include polyvinyl cinnamate and polyvinyl esters of paramethoxycinnamic acid.

As used herein the term "rubbed-orientation material" means a material that can be at least partially ordered by rubbing at least a portion of a surface of the material with another suitably textured material. For example, although not limiting herein, in one non-limiting embodiment, the rubbed-orientation material can be rubbed with a suitably textured cloth or a velvet brush. Non-limiting examples of rubbed-orientation materials that are suitable for use as an alignment medium in conjunction with various non-limiting embodiments disclosed herein include (poly)imides, (poly)siloxanes, (poly)acrylates, and (poly)coumarines. Thus, for example, although not limiting herein, in one non-limiting embodiment, the at least partial coating comprising the alignment medium can be an at least partial coating comprising a polyimide that has been rubbed with velvet or a cloth so as to at least partially order at least a portion of the surface of the polyimide.

Further, as discussed above, the orientation facilities according to certain non-limiting embodiments disclosed herein can comprise an at least partially ordered polymer sheet. For example, although not limiting herein, a sheet of polyvinyl alcohol ("PVA") can be at least partially ordered by stretching the polymer sheet to at least, and thereafter the sheet can be connected to at least a portion of a surface of the optical substrate to form the orientation facility. Alternatively, the ordered polymer sheet can be made by a method that at least partially orders the polymer chains during fabrication, for example and without limitation, by extrusion. Still further, the at least partially ordered polymer sheet can be made using photo-orientation methods. For example and without limitation, an sheet of a photo-orientation material can be formed, for example by cast, and at least partially ordered by exposure to linearly polarized UV radiation.

Still further, the orientation facilities according to various non-limiting embodiments disclosed herein can comprise an at least partially treated surface. As used herein, the term "treated surface" refers to at least a portion of a surface that has been physically altered to create at least one ordered region on least a portion of the surface. Non-limiting examples of at least partially treated surfaces include at least partially rubbed surfaces, at least partially etched surfaces, and at least partially embossed surfaces. Further, the at least partially treated surfaces can be patterned, for example using a photolithographic or interferographic process. Non-limiting examples of at least partially treated surfaces that are useful in forming the orientation facilities according to various non-limiting embodiments disclosed herein include, chemically etched surfaces, plasma etched surfaces, nano-etched surfaces (such as surfaces etched using a scanning tunneling microscope or an atomic force microscope), laser etched surfaces, and electron-beam etched surfaces.

In one specific non-limiting embodiment, wherein the orientation facility comprises an at least partially treated surface, imparting the orientation facility can comprise depositing a metal salt (such as a metal oxide or metal fluoride) onto at least a portion of a surface, and thereafter etching the deposit to form the orientation facility. Non-limiting examples of suitable techniques for depositing a metal salt include plasma vapor deposition, chemical vapor deposition, and sputtering. Non-limiting examples of etching processes are set forth above.

As used herein the term "Langmuir-Blodgett films" means one or more at least partially ordered molecular films on a surface. For example, although not limiting herein, a Langmuir-Blodgett film can be formed by dipping a substrate into a liquid one or more times so that it is at least partially covered by a molecular film and then removing the substrate from the liquid such that, due to the relative surface tensions of the liquid and the substrate, the molecules of the molecular film are at least partially ordered in a general direction. As used herein, the term molecular film refers to monomolecular films (i.e., monolayers) as well as films comprising more than one monolayer.

Another non-limiting embodiment provides a method of making an alignment facility for an optical dye on at least a portion of an optical substrate comprising forming an at least partial coating comprising an at least partially ordered phase-separated polymer on at least a portion of the optical substrate. According to this non-limiting embodiment, forming the at least partial coating can comprise applying a phase-separating polymer system comprising a matrix phase forming material and a guest phase forming material onto at least a portion of the optical substrate, and thereafter, at least partially ordering at least a portion of the matrix phase forming material and at least a portion of the guest phase forming material such that at least a portion of the matrix phase forming material has at least a first general direction and at least a portion of the guest phase forming material has at least a second general direction that is generally parallel to at least the first general direction. After at least partially ordering, at least a portion of the guest phase forming material can be separated from at least a portion of the matrix phase forming material by at least one of polymerization induced phase-separation and solvent induced phase-separation to form a matrix phase and a guest phase.

According to various non-limiting embodiments disclosed herein, the matrix phase forming material can comprise a liquid crystal material chosen from liquid crystal monomers, liquid crystal pre-polymers, and liquid crystal polymers. Further, according to various non-limiting embodiments, the guest phase forming material can comprise a liquid crystal material chosen from liquid crystal mesogens, liquid crystal monomers, and liquid crystal polymers and pre-polymers. Non-limiting examples of such materials are set forth in detail above.

Non-limiting methods of at least partially ordering at least a portion of the of the matrix phase forming material and at least a portion of the guest phase forming material of the phase-separating polymer system include those set forth above for ordering liquid crystal materials. For example, although not limiting herein, at least partially ordering at least a portion of the matrix phase forming material and at least a portion of the guest phase forming material can comprise exposing the portions to at least one of: a magnetic field, an electric field, linearly polarized infrared radiation, linearly polarized ultraviolet radiation, linearly polarized visible radiation and a shear force. Further, at least partially ordering the portions can comprise at least partially aligning the portions with an orientation facility, as described in more detail below.

As previously discussed, after at least partially ordering at least a portion of the matrix phase forming material and the guest phase forming material, at least a portion of the guest phase forming material can be separated from at least a portion of the matrix phase forming material by at least one of polymerization induced phase separation and solvent induced phase separation. For clarity the separation of the matrix and guest phase forming materials is described herein in relation to the guest phase forming material being separated from the matrix phase forming material, however, it should be appreciated that this language is intended to cover any separation between the two phase forming materials. That is, this language is intended to cover separation of the guest phase forming material from the matrix phase forming material and separation of the matrix phase forming material from the guest phase forming material, as well as, simultaneous separation of both phase forming materials, or any combination thereof. Although not limiting herein, it is generally believed that during phase separation, the components of the phase-separating system (i.e., the matrix and guest phase forming materials) will separate from each other by first forming a gel of nanoscale (that is, nanometer sized) zones of each phase forming material. These zones will subsequently coalesce into distinct phase regions.

In one specific non-limiting embodiment, the phase-separating polymer system can comprise a mixture of a matrix phase forming material comprising a liquid crystal monomer and a guest phase forming material comprising at least one liquid crystal mesogen. According to this non-limiting embodiment, causing a least a portion of the guest phase forming material to separate from at least a portion of the matrix phase forming material can comprise polymerization induced phase-separation. That is, at least a portion of the liquid crystal monomer of the matrix phase can be polymerized and thereby separated from at least a portion of the at least one liquid crystal mesogen of the guest phase forming material. Non-limiting methods of polymerization that can be used in conjunction with various non-limiting embodiments disclosed herein include photo-induced polymerization and thermally-induced polymerization.

In another specific non-limiting embodiment, the phase-separating polymer system can comprise a mixture of a matrix phase forming material comprising a liquid crystal monomer and a guest phase forming material comprising a low viscosity liquid crystal monomer having a different functionality from the liquid crystal monomer of the matrix phase. As used herein, the term "low viscosity liquid crystal monomer," refers to a liquid crystal monomer mixture or solution that is freely flowing at room temperature. According to this non-limiting embodiment, causing a least a portion of the guest phase forming material to separate from at least a portion of the matrix phase forming material can comprise polymerization induced phase-separation. That is, at least a portion of the liquid crystal monomer of the matrix phase can be polymerized under conditions that do not cause the liquid crystal monomer of the guest phase to polymerize. During polymerization of the matrix phase forming material, the guest phase forming material will separate from the matrix phase forming material. Thereafter, the liquid crystal monomer of the guest phase forming material can be polymerized in a separate polymerization process.

In another specific non-limiting embodiment, the phase-separating polymer system can comprise a solution, in at least one common solvent, of a matrix phase forming material comprising a liquid crystal polymer and a guest phase forming material comprising a liquid crystal polymer that is different from the liquid crystal polymer of the matrix phase forming material. According to this non-limiting embodiment, causing at least a portion of the guest phase forming material to separate from the matrix phase forming material can comprise solvent induced phase-separation. That is, at least a portion of the at least one common solvent can be evaporated from the mixture of liquid crystal polymers, thereby causing the two phases to separate from each other.

Another non-limiting embodiment provides a method of making an alignment facility for an optical dye on at least a portion of an optical substrate comprising imparting an orientation facility to at least a portion of the optical substrate and forming an at least partial coating comprising an at least partially ordered phase-separated polymer on at least a portion of the orientation facility. According to this non-limiting embodiment, a phase-separating polymer system comprising a matrix phase forming material comprising a liquid crystal material and a guest phase forming material comprising a liquid crystal material can be applied on at least a portion of the orientation facility. Thereafter, at least a portion of the matrix phase forming material and at least a portion of the guest phase forming material of the phase-separating polymer system can be at least partially ordered such that the at least partially ordered portion of the matrix phase forming material has at least a first general direction and the at least partially ordered portion of the guest phase forming material has at least a second general direction that is generally parallel to at least the first general direction. After at least partially ordering at least a portion of the matrix phase forming material and the guest phase forming material, at least a portion of the guest phase forming material is separated from at least a portion of the matrix phase forming material by at least one of polymerization induced phase-separation and solvent induced phase-separation.

Further, according to this non-limiting embodiment, at least partially ordering at least a portion of the matrix phase forming material and at least a portion of the guest phase forming material can comprise aligning the portions with at least a portion of the orientation facility. Further, although not required, at least a portion of the matrix phase forming material and the at least a portion of the guest phase forming material can be exposed to at least one of: a magnetic field, an electric field, linearly polarized infrared radiation, linearly polarized ultraviolet radiation, linearly polarized visible radiation and a shear force to at least partially order the portion, either alone or in combination with aligning the portion with the orientation facility. Non-limiting methods of imparting the orientation facility, as well as suitable non-limiting methods and materials for forming the at least partial coating comprising the phase-separated polymer are set forth above in detail.

Generally speaking, the thickness of the at least partial coating comprising the at least partially ordered phase-separated polymer of the alignment facilities according to various non-limiting embodiments disclosed herein can be chosen so as to achieve the desired overall thickness of the alignment facility. For example and without limitation, according to various non-limiting embodiments, the thickness of the at least partial coating comprising the phase-separated polymer can range from: 1 micron to 100 microns, from 10 microns to 50 microns, and from 20 microns to 40 microns.

As previously discussed, generally, the time required to align a liquid crystal material will depend, in part, upon the thickness of the liquid crystal material. However, by forming an at least partial coating comprising a phase-separated polymer according to various non-limiting embodiments disclosed herein, the time required to align the liquid crystal materials of the phase-separating polymer system can be reduced as compared to the time required to align a single-phase coating of a liquid crystal material having the same thickness. For example, in one non-limiting embodiment, an least partial coating comprising a phase-separated polymer and having a thickness ranging from 15 to 20 microns can be formed on at least a portion of a orientation facility comprising an at least partially ordered photo-orientation material. Further, according to this non-limiting embodiment, at least partially aligning at least a portion of the matrix phase and at least a portion of the guest phase of the phase-separating polymer system can comprise waiting less than 30 minutes.

Another non-limiting embodiment provides a method of making an alignment facility for an optical dye, the method comprising forming a sheet comprising (i) an at least partially ordered liquid crystal polymer having at least a first general direction, and (ii) an at least partially ordered liquid crystal material distributed within at least a portion of the at least partially ordered liquid crystal polymer. Further, according to this non-limiting embodiment, the at least partially ordered liquid crystal material distributed within the at least a portion of the at least partially ordered liquid crystal polymer can have at least a second general direction that is generally parallel to at least the first general direction of the liquid crystal polymer.

For example, although not limiting herein, according to one non-limiting embodiment, forming the sheet comprising the at least partially ordered liquid crystal polymer and the at least partially ordered liquid crystal material distributed within at least a portion the at least partially ordered liquid crystal polymer can comprise applying a phase-separating polymer system comprising a matrix phase forming material comprising a liquid crystal material and a guest phase forming material comprising a liquid crystal material on to at least a portion a substrate. Thereafter, at least a portion of the matrix phase forming material and at least a portion of the guest phase forming material can be at least partially ordered. After at least partially ordering at least a portion of the phase forming materials, at least a portion of the guest phase forming material can be separated from at least a portion of the matrix phase forming material by at least one of polymerization induced phase-separation and solvent induced phase-separation, and the at least partially ordered, phase-separated polymer coating can be removed from the substrate to form the sheet.

According to another non-limiting embodiment, forming the sheet comprising the at least partially ordered liquid crystal polymer matrix and the at least partially ordered liquid crystal material distributed within at least a portion the at least partially ordered liquid crystal polymer matrix can comprise forming an at least partially ordered liquid crystal polymer sheet, and imbibing at least one liquid crystal mesogen into at least a portion of the at least partially ordered liquid crystal polymer sheet. For example, according to this non-limiting embodiment, a sheet comprising a liquid crystal polymer can be formed and at least partially ordered by a method of forming a polymer sheet that can at least partially order the liquid crystal polymer during formation, for example, by extrusion. Alternatively, a liquid crystal polymer can be cast onto a substrate and at least partially ordered by one of the non-limiting methods of at least partially ordering liquid crystal materials set forth above. For example, although not limiting herein, at least a portion of the liquid crystal material can be exposed to a magnetic or an electric field. After being at least partially ordered, the liquid crystal polymer can be at least partially set and removed from the substrate to form a sheet comprising an at least partially ordered liquid crystal polymer matrix. Still further, a liquid crystal polymer sheet can be cast, at least partially set, and subsequently stretched to form sheet comprising an at least partially ordered liquid crystal polymer.

After forming the sheet comprising the at least partially ordered liquid crystal polymer, at least one liquid crystal mesogen can be imbibed into at least a portion of the liquid crystal polymer sheet. For example, although not limiting herein, liquid crystal mesogens can be imbibed into at least a portion of the liquid crystal polymer by applying a solution or mixture of the liquid crystal mesogens in a carrier to a portion of the liquid crystal polymer and, thereafter, allowing the liquid crystal mesogens to diffuse into the liquid crystal polymer sheet, either with or without heating. Alternatively, the liquid crystal polymer sheet can be immersed into a solution or mixture of the liquid crystal mesogens in a carrier and the liquid crystal mesogens can be imbibed into the liquid crystal polymer sheet by diffusion, either with or without heating.

According to still another non-limiting embodiment, forming the sheet comprising the at least partially ordered liquid crystal polymer and the at least partially ordered liquid crystal material distributed within at least a portion the at least partially ordered liquid crystal polymer can comprise forming a liquid crystal polymer sheet, imbibing at least a portion of the liquid crystal polymer sheet with at least one liquid crystal mesogen, and thereafter at least partially ordering at least a portion of the liquid crystal polymer and at least a portion of the at least one liquid crystal mesogen distributed therein. Although not limiting herein, for example, at least a portion of the liquid crystal polymer sheet and at least a portion of the at least one liquid crystal mesogen distributed therein can be at least partially ordered by stretching the liquid crystal polymer sheet. Further according to this non-limiting embodiment, the liquid crystal polymer sheet can be formed using conventional polymer processing techniques, such as, but not limited to, extrusion and casting.

Generally speaking, the sheets comprising the at least partially ordered liquid crystal polymer and the at least partially ordered liquid crystal material distributed therein according to various non-limiting embodiments disclosed herein can have any thickness necessary so as to achieve the desired overall thickness of the alignment facility. For example, in one non-limiting embodiment, the thickness of the sheet can range from 1 micron to 100 microns. In another non-limiting embodiment, the thickness of the sheet can range from 10 microns to 50 microns. In still another non-limiting embodiment, the thickness of the sheet can range from 20 microns to 40 microns.

Further, according to the various non-limiting embodiments, the sheet comprising a liquid crystal polymer and a the liquid crystal material distributed therein can be connected to at least a portion of an optical substrate by at least one of laminating, fusing, in-mold casting, and adhesively bonding at least a portion of the sheet to the optical substrate.

Another non-limiting embodiment provides a method of making an alignment facility for an optical dye comprising forming an at least partial coating comprising an interpenetrating polymer network on at least a portion of an optical substrate. As used herein the term "interpenetrating polymer network" means an entangled combination of polymers, at least one of which is cross-linked, that are not bonded to each other. Thus, as used herein, the term interpenetrating polymer network includes semi-interpenetrating polymer networks. For example, see L. H. Sperling, *Introduction to Physical Polymer Science*, John Wiley & Sons, New York (1986) at page 46. According to this non-limiting embodiment, the method comprises imparting an orientation facility on at least a portion of an optical substrate and applying a polymerizable composition and a liquid crystal material to the at least a portion of the orientation facility. Thereafter, at least a portion of the liquid crystal material can be at least partially aligned with at least a portion of the orientation facility. After at least partially aligning at least a portion of the liquid crystal material, at least a portion of the at least partial coating can be subjected to a dual curing process, wherein at least a portion of the liquid crystal material is at least partially set and at least a portion of the polymerizable composition is at least partially set. According to this non-limiting embodiment, at least partially setting at least a portion of the liquid crystal material can occur before, after, or at essentially the same time as at least partially setting the polymerizable composition.

For example, in one non-limiting embodiment at least a portion of the liquid crystal material of the interpenetrating polymer network can be exposed to ultraviolet radiation to at least partially set at least a portion of the liquid crystal material. Thereafter, at least a portion of the polymerizable composition can be at least partially set by exposure to thermal energy. Although not limiting herein, according to this non-limiting embodiment, the polymerizable composition can comprise dihydroxy and isocyanate monomers, and a liquid crystal material can comprise a liquid crystal monomer. As used herein, the term "thermal energy" means any form of heat.

In another non-limiting embodiment, at least a portion of the polymerizable composition can be exposed to thermal energy sufficient to cause at least a portion of the polymerizable composition to at least partially set prior to exposing at least a portion of the liquid crystal material to ultraviolet radiation to cause at least a portion of the liquid crystal material to at least partially set. Further, at least a portion of the liquid crystal material can be at least partially aligned before, during or after exposing at least a portion of the coating to thermal energy and prior to at least partially setting at least a portion of the liquid crystal material.

In still another non-limiting embodiment, at least partially setting at least a portion of the polymerizable composition can occur at essentially the same time as at least partially setting at least a portion of the liquid crystal material, for example, by simultaneously exposing the at least partial coating to UV and thermal energy.

Generally, the at least partial coatings comprising the interpenetrating polymer network according to various non-limiting embodiments disclosed herein can have any thickness necessary to achieve the desired thickness of the alignment facility. For example, although not limiting herein, in one non-limiting embodiment, the thickness of the at least partial coating comprising the interpenetrating polymer network can range from 1 to 100 microns. Further, according to various non-limiting embodiments disclosed herein, the polymerizable composition of the interpenetrating polymer network can be an isotropic material or an anisotropic material, provided that the at least partial coating is, on the whole, anisotropic.

Figure 2:
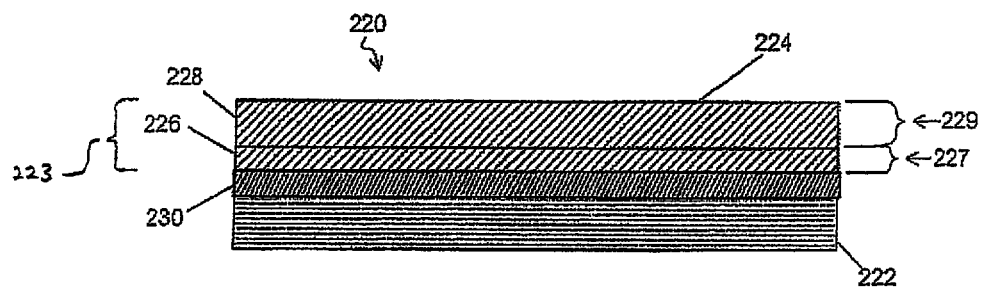
FIGS. 2 and 3 are schematic, cross-sectional views of an optical element according to various non-limiting embodiments disclosed herein.

Optical elements according to various non-limiting embodiments will now be described. Referring now to FIG. 2, one non-limiting embodiment provides an ophthalmic element, which is generally indicated 220, comprising an ophthalmic substrate 222 and an alignment facility (generally indicated 223) for an optical dye comprising at least one at least partial coating 224 comprising an at least partially ordered liquid crystal material connected to at least a portion thereof. As used herein the term "connected to" means in direct contact with an object or in indirect contact with an object through one or more other structures or materials, at least one of which is in direct contact with the object. Non-limiting methods of forming such alignment facilities are set forth above in detail. Further, non-limiting examples of optical elements and substrates, as well as ophthalmic elements and substrates, that can be used in conjunction with various non-limiting embodiments of optical elements and ophthalmic elements disclosed herein are set forth above in detail.

As discussed above, the time required to align thick, single-phase liquid crystal coatings is generally longer than the time required to align thinner coatings of the same material. Thus, although not required, according to certain non-limiting embodiments wherein optical elements having thick alignment facilities are desired, the alignment facility can comprise a plurality of at least partial coatings. For example, with continued reference to FIG. 2, according to one non-limiting embodiment, the at least one at least partial coating 224 of alignment facility 223 can comprise a first at least partial coating 226 comprising an at least partially ordered liquid crystal material and at least one additional at least partial coating 228 comprising an at least partially aligned liquid crystal material on at least a portion of the first at least partial coating 226.

Although not limiting herein, for example, according to various non-limiting embodiments, the first at least partial coating 226 can have a thickness (generally indicated 227) ranging from: 0.5 to 20 microns, 0.5 to 10 microns, and 2 to 8 microns. Further, for example and without limitation, according to various non-limiting embodiments disclosed herein, the at least one additional at least partial coating 228 can have a thickness (generally indicated 229) ranging from 1 micron to 25 microns, can further have a thickness ranging from 5 microns to 20 microns. According to still another non-limiting embodiment, at least one additional at least partial coating can have a thickness greater than 6 microns, and can further have a thickness of at least 10 microns.

Still further, according to various non-limiting embodiments disclosed herein, the first at least partial coating 226 can be thinner than the at least one additional at least partial coating 228. For example and without limitation, in one non-limiting embodiment, the first at least partial coating 226 can have a thickness ranging from 2 microns to 8 microns and the at least one additional at least partial coating 228 can have a thickness ranging from 10 microns to 20 microns. Non-limiting methods of making such coatings are described above in detail.

Further according to various non-limiting embodiments disclosed herein, the at least partial coating(s) (or sheets) of the alignment facility can further comprise at least one additive chosen from alignment promoters, kinetic enhancing additives, photoinitiators, thermal initiators, polymerization inhibitors, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, and adhesion promoters (such as hexanediol diacrylate and coupling agents).

As used herein, the term "alignment promote" means an additive that can facilitate at least one of the rate and uniformity of the alignment of a material to which it is added. Non-limiting examples of alignment promoters that can be present in the at least partial coatings (and sheets) according to various non-limiting embodiments disclosed herein include those described in U.S. Pat. No. 6,338,808 and U.S. Patent Publication No. 2002/0039627, which are hereby specifically incorporated by reference herein.

Non-limiting examples of kinetic enhancing additives that can be present in the at least partial coatings (and sheets) according to various non-limiting embodiments disclosed herein include epoxy-containing compounds, organic polyols, and/or plasticizers. More specific examples of such kinetic enhancing additives are disclosed in U.S. Pat. No. 6,433,043 and U.S. Patent Publication No. 2003/0045612, which are hereby specifically incorporated by reference herein.

Non-limiting examples of photoinitiators that can be present in the at least partial coatings (and sheets) according to various non-limiting embodiments disclosed herein include cleavage-type photoinitiators and abstraction-type photoinitiators. Non-limiting examples of cleavage-type photoinitiators include acetophenones, α-aminoalkylphenones, benzoin ethers, benzoyl oximes, acylphosphine oxides and bisacylphosphine oxides or mixtures of such initiators. A commercial example of such a photoinitiator is DARO-CURE® 4265, which is available from Ciba Chemicals, Inc. Non-limiting examples of abstraction-type photoinitiators include benzophenone, Michler's ketone, thioxanthone, anthraquinone, camphorquinone, fluorone, ketocoumarin or mixtures of such initiators.

Another non-limiting example of a photoinitiator that can be present in the at least partial coatings (and sheets) according to various non-limiting embodiments disclosed herein is a visible light photoinitiator. Non-limiting examples of suitable visible light photoinitiators are set forth at column 12, line 11 to column 13, line 21 of U.S. Pat. No. 6,602,603, which is specifically incorporated by reference herein.

Non-limiting examples of thermal initiators include organic peroxy compounds and azobis(organonitrile) compounds. Specific non-limiting examples of organic peroxy compounds that are useful as thermal initiators include peroxymonocarbonate esters, such as tertiarybutylperoxy isopropyl carbonate; peroxydicarbonate esters, such as di(2-ethylhexyl)peroxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide and p-chlorobenzoyl peroxide; peroxyesters such as t-butylperoxy pivalate, t-butylperoxy octylate and t-butylperoxyisobutyrate; methylethylketone peroxide, and acetylcyclohexane sulfonyl peroxide. In one non-limiting embodiment the thermal initiators used are those that do not discolor the resulting polymerizate.

Non-limiting examples of azobis(organonitrile) compounds that can be used as thermal initiators include azobis (isobutyronitrile), azobis(2,4-dimethylvaleronitrile) or a mixture thereof.

Non-limiting examples of polymerization inhibitors include: nitrobenzene, 1,3,5,-trinitrobenzene, p-benzoquinone, chloranil, DPPH, $FeCl_3$, $CuCl_2$, oxygen, sulfur, aniline, phenol, p-dihydroxybenzene, 1,2,3-trihydroxybenzene, and 2,4,6-trimethylphenol.

Non-limiting examples of solvents that can be present in the at least partial coating (and sheets) according to various non-limiting embodiments disclosed herein include those that will dissolve solid components of the coating, that are compatible with the coating and the elements and substrates, and/or can ensure uniform coverage of the exterior surface(s) to which the coating is applied. Potential solvents include, but are not limited to, the following: acetone, amyl propionate, anisole, benzene, butyl acetate, cyclohexane, dialkyl ethers of ethylene glycol, e.g., diethylene glycol dimethyl ether and their derivates (sold as CELLOSOLVE® industrial solvents), diethylene glycol dibenzoate, dimethyl sulfoxide, dimethyl formamide, dimethoxybenzene, ethyl acetate, isopropyl alcohol, methyl cyclohexanone, cyclopentanone, methyl ethyl ketone, methyl isobutyl ketone, methyl propionate, propylene carbonate, tetrahydroduran, toluene, xylene, 2-methoxyethyl ether, 3-propylene glycol methyl ether, and mixtures thereof.

Further, as previously discussed, one or more optical dyes can be in contact with at least partial coatings (and sheets) of the alignment facilities according to various non-limiting embodiments disclosed herein.

Referring again to FIG. 2, in addition to the at least one at least partial coating 224 comprising the at least partially ordered liquid crystal material, the ophthalmic element 220 can further comprise an orientation facility 230 interposed between at least a portion of the at least one at least partial coating 224 of the alignment facility 223 and the ophthalmic substrate 222. Non-limiting examples of suitable orientation facilities and methods of making the same are set forth above.

Moreover, although not shown in the figures, in addition to the alignment facility, the optical elements according to various non-limiting embodiments disclosed herein can further comprise at least one at least partial primer coating interposed between at least a portion of the at least partial coating of the alignment facility and the optical substrate, or between at least a portion of an orientation facility and the optical substrate. Non-limiting examples of such coatings are set forth above in detail.

Figure 3:
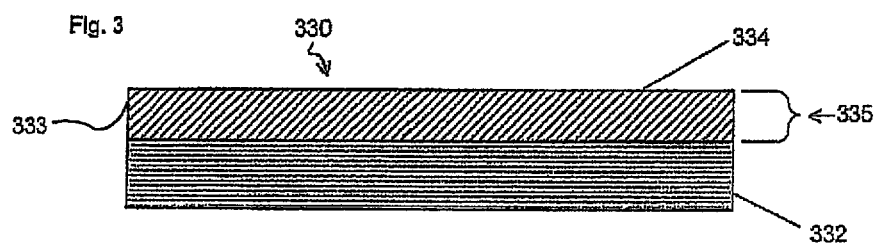

Referring now to FIG. 3, another non-limiting embodiment provides an optical element (generally indicated 330) comprising an optical substrate 332, and an alignment facility (generally indicated 333) for an optical dye connected to at least a portion of the optical substrate. According to this non-limiting embodiment, the alignment facility 333 comprises an at least partial coating 334 having a thickness (generally indicated 335) greater than 6 microns and comprising an at least partially ordered liquid crystal material. Further, according to this non-limiting embodiment, the at least partial coating 334 can have thickness 335 of at least 10 microns. According to still other non-limiting embodiments, at least partial coating 334 can have a thickness 335 ranging from 50 microns to 1000 microns or more. Non-limiting methods and material for making such coatings are described above in detail.

Another non-limiting embodiment provides an alignment facility for an optical dye comprising an at least partial coating comprising an at least partially ordered phase-separated polymer, the phase-separated polymer comprising a matrix phase comprising a liquid crystal material at least a portion of which is at least partially ordered in at least a first general direction and a guest phase comprising a liquid crystal material distributed within the matrix phase, wherein at least a portion of the liquid crystal material of the guest phase is at least partially ordered in at least a second general direction that is generally parallel to at least the first general direction. Further, according to this non-limiting embodiment, alignment facility can be connected to an optical substrate to form an optical element. For example, according to one non-limiting embodiment there is provided an optical element comprising an optical substrate and an alignment facility for an optical dye connected to at least a portion of the optical substrate, the alignment facility comprising an at least partial coating comprising an at least partially ordered phase-separated polymer. Non-limiting methods of forming such alignment facilities are described above.

Figure 4:
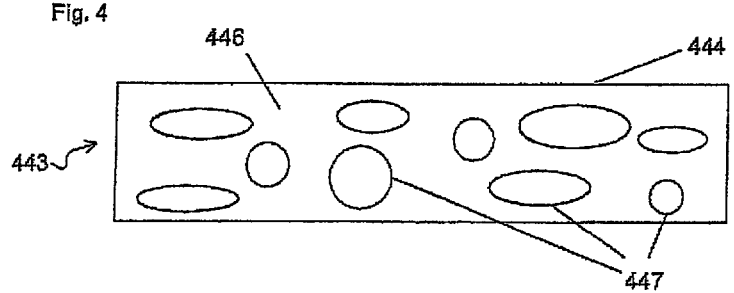
FIG. 4 is a schematic, top-plane view of an alignment facility according to one non-limiting embodiment disclosed herein.

Referring now to FIG. 4, another non-limiting embodiment provides an alignment facility (generally indicated 443) for an optical dye comprising a sheet 444 comprising an at least partially ordered liquid crystal polymer 446 having at least a first general direction and a an at least partially ordered liquid crystal material 447 distributed within at least a portion of the liquid crystal polymer 446, wherein the at least partially ordered liquid crystal material 447 has at least a second general direction that is generally parallel to at least the first general direction of the liquid crystal polymer 446. According to one non-limiting embodiment, the sheet 444 can be formed from a phase-separating polymer system as discussed above. Alternatively, according to another non-limiting embodiment, the sheet 444 can be formed using the imbibition techniques previously discussed.

Although not limiting herein, as discussed above, according to various non-limiting embodiments, the sheet can be connected to at least a portion of an optical substrate. Non-limiting methods of connecting the sheet to at least a portion of the optical substrate include: laminating, fusing, in-mold casting, adhesively bonding, and combinations thereof. As used herein, the term "in-mold casting" includes a variety of casting techniques, such as but not limited to: overlaying, wherein the sheet is placed in a mold and the substrate is formed (for example by casting) over at least a portion of the substrate; and injection molding, wherein the substrate is formed around the sheet.

One non-limiting embodiment provides an optical element comprising an optical substrate and an alignment facility comprising a sheet comprising an at least partially ordered liquid crystal polymer having at least a first general direction and a an at least partially ordered liquid crystal material having at least a second general direction distributed within at least a portion of the at least partially ordered liquid crystal polymer matrix. Further, according to this non-limiting embodiment, at least the second general direction can be generally parallel to at least the first general direction of the liquid crystal polymer. As discussed above, a variety of methods can be used to connect the sheet of the alignment facility to the optical substrate.

Another non-limiting embodiment provides an alignment facility for an optical dye comprising an at least partial coating of interpenetrating polymer network comprising a polymer and an at least partially ordered liquid crystal material. Further, as previously discussed, the alignment facility can be connected to at least a portion of an optical substrate. For example, one non-limiting embodiment provides an optical element comprising an optical substrate and an alignment facility for an optical dye connected to at least a portion of the optical substrate, wherein the alignment facility comprises an at least partial coating of an interpenetrating polymer network comprising a polymer and an at least partially ordered liquid crystal material. Non-limiting methods of forming at least partial coatings comprising an at least partially aligned interpenetrating polymer network are set forth above.

Various non-limiting embodiments disclosed herein will now be illustrated in the following non-liming examples.

EXAMPLES

Example 1

Part A

Two coating compositions (indicated as Coating Composition 1 and Coating Composition 2 in Table I) were formed by adding the materials listed in Table I in the order listed to a beaker with stirring:

TABLE I

| Coating Composition | Amount in grams |
|---|---|
| Coating Composition 1: | |
| RM 82[1] | 0.5 |
| RM 105[2] | 0.5 |
| RM 257[3] | 0.5 |
| RM 23[4] | 0.5 |
| Anisole | 1.3 |
| BYK ®-346 additive[5] | 0.01 |
| Irgacure ® 819[6] | 0.10 |
| Coating Composition 2: | |
| RM 82 | 0.5 |
| RM 105 | 0.5 |
| RM 257 | 0.5 |
| RM 23 | 0.5 |
| Licristal ® E-7[8] | 0.2 |
| Anisole | 1.1 |

TABLE I-continued

| Coating Composition | Amount in grams |
|---|---|
| BYK ®-346 additive | 0.01 |
| Irgacure ® 819 | 0.10 |

[1] RM 82 is a liquid crystal monomer (LCM) available from EMD Chemicals, Inc and is reported to have the molecular formula of $C_{39}H_{44}O_{10}$.
[2] RM 105 is a liquid crystal monomer (LCM) available from EMD Chemicals, Inc and is reported to have the molecular formula of $C_{23}H_{26}O_6$.
[3] RM 257 is a liquid crystal monomer (LCM) available from EMD Chemicals, Inc and is reported to have the molecular formula of $C_{33}H_{32}O_{10}$
[4] RM 23 is a liquid crystal monomer (LCM) available from EMD Chemicals, Inc and is reported to have the molecular formula of $C_{23}H_{23}NO_5$.
[5] BYK ®-346 additive is a silicone surfactant reported to be a polyether modified polydimethyl-siloxane available from BYK Chemie, USA.
[6] Irgacure ® 819 is a photoinitiator available from Ciba-Geigy Corporation.
[8] Licristal ® E7 is a liquid crystal mesogen mixture available from EM Industries More particularly, Coating Composition 1 is a non-phase-separating polymer system, and Coating Composition 2 is a phase-separating polymer system comprising a matrix phase forming material comprising the above described liquid crystal monomers and a guest phase forming material comprising Licristal® E7 liquid crystal mesogens.

Part B

Six (6) square test substrates measuring 2"×2"×0.25" (5.08 cm×5.08 cm×0.635 cm), which formed from polymerizates of CR-39® monomer (which is available from Homalite), were washed in a solution of liquid soap and water, rinsed with deionized water, and subsequently rinsed with isopropyl alcohol. The cleaned test substrates were dried and treated with oxygen plasma at a flow rate of 100 milliliters (mL) per minute of oxygen at 100 watts of power for one minute.

Part C

An orientation facility was formed on each of the 4 test substrates as follows.

A solution of a photo-orientable polymer network available as Staralign™ 2200 CP4 solution from Huntsman Advanced Materials, which designation is reported to mean 4 weight percent in cyclopentanone, was applied to a portion of the surface of each test substrate by dispensing the Staralign™ solution for 2 to 3 seconds onto the substrate. As the Staralign™ solution was dispensed onto the substrates, the substrates were spun at 800 revolutions per minute for about 2 to 3 minutes. Afterwards, the coated substrates were placed in an oven maintained at 130° C. for 15 minutes.

After application, the photo-orientable polymer network was at least partially ordered by exposure to linearly polarized ultraviolet radiation for 1 minute at a peak intensity of 18 milliWatts/cm² of UVA (320-390 nm) as measured using a UV Power Puck™ electro-optic radiometer (which is available from Electronic Instrumentation and Technology, Inc.). The source of linearly polarized UV radiation was a BLAK-RAY Model B-100A Longwave UV Lamp. The light source was oriented such that the radiation was linearly polarized in a plane perpendicular to the surface of the substrate. After ordering at least a portion of the photo-orientable polymer network, the substrates were cooled to room temperature and kept covered.

Part D

Coatings of Coating Composition 1 and 2 where then formed on two (2) of the substrates prepared in Part C as follows. For each substrate, one of the two coating compositions was applied to at least a portion of the orientation facility on the surface of the substrate by spin coating. More specifically, approximately 1 mL of the selected coating composition was dispensed onto at least a portion of the orientation facility as the substrate, and any excess was drained off prior to spinning at 400 revolutions per minute for 3 minutes for all of the samples. After applying the coating composition, the substrate was placed in a 45° C. oven for up to 60 minutes to permit at least a portion of the anisotropic material of the coating composition to align with the orientation facility. Alignment of the coatings was periodically checked during this time by removing the substrate from the oven and examining the substrate using two cross-polarized films (#45669) from Edmund Industrial Optics as described below in more detail.

To check alignment, the coated substrate was positioned between the cross-polarized films so that the coated substrate was parallel with at least one of the films such that visible light transmitted through this configuration. At least partial alignment was verified by observing an increase in the transmitted visible light when one of the polarizing films was rotated 45 degrees clockwise or counterclockwise while viewing a visible light source through this configuration.

After alignment, the coatings were at least partially set by curing. During curing of Coating Composition 2, the liquid crystal mesogen of the guest phase forming material was separated from the liquid crystal monomers of the matrix phase forming material as the matrix phase forming material was polymerized. The resulting coating comprises a phase-separated polymer comprising a liquid crystal polymer matrix with the guest phase (i.e., the liquid crystal mesogens) distributed therein.

The time to alignment was measured for the substrates coated with Coating Composition 1 and Coating Composition 2 using the aforementioned method. The results in minutes are listed in Table II.

TABLE II

| Coating Composition No. | Time to Alignment |
|---|---|
| 1 | 30-60 minutes |
| 2 | 10-20 minutes |

The results of Table 1 show that the phase-separating polymer system of Coating Composition 2 was at least partially aligned in a shorter time period than the liquid crystal monomer system of Coating Composition 1.

Example 2

Coatings of Coating 1 or 2 were formed on the remaining four (4) substrates prepared above in Part C using the coating parameters set forth in Table III.

TABLE III

| Sample No. | Coating Composition No. | Spin Rate (rpm) | Spin Time (seconds) | Time for Alignment (minutes) |
|---|---|---|---|---|
| 1 | 1 | 200 | 300 | 25 |
| 2 | 1 | 200 | 300 | 22 |
| 3 | 2 | 200 | 300 | 5 |
| 4 (A) | 1 | 800 | 75 | 2 |
| 4 (B) | 1 | 300 | 300 | 5 |

Sample 4 represents a single substrate to which a first coating (A) was applied and aligned as indicated above in Table III to form Sample 4(A). Thereafter, an additional coating (B) was applied on the first coating (A) and aligned as indicated in Table III to form Sample 4(B). Thus, Sample 4B had two coating applied thereon.

After application of the coating, the time for at least partial alignment to occur was determined as previously described. Thereafter, the coatings were further cured by covering the coated substrate with a cut-off filter (to screen out the ultraviolet wavelengths less than 390 nanometers) so that the cut-off filter was about 1 mm above the surface of the coated substrate. The resulting assembly was placed on an ultraviolet conveyor curing line (obtained from Eye Ultraviolet, Inc) and conveyed at three feet per minute beneath two ultraviolet "type D" 400 watt/inch iron iodide doped mercury lamps 10" in length, one positioned 2.5" above the conveyor and the other positioned 6.5" above the conveyor. During curing, the peak intensity of UVA (320 to 390 nm) was 0.239 Watts/cm$^2$ and of UVV (395 to 445 nm) was 0.416 Watts/cm$^2$, as measured using a UV Power Puck™ electro-optic radiometer, described hereinbefore. The UV conveyor curing line had a nitrogen atmosphere in which the oxygen level was less than 100 ppm.

As previously discussed in Example 1, during curing of Coating Composition 2, the guest phase forming material was separated from the matrix phase forming material. Further, as discussed above, the above-described procedure was repeated twice for sample 4(B) using Coating Composition 1.

Example 3

The samples prepared in Example 2 were further analyzed to rate the degree of alignment and the thickness of the coatings as follows. The degree of alignment for each of two regions "a" and "b" on each of the samples was determined in a qualitative manner using the technique for checking the alignment (previously described) and assigned the rating of "good", "poor" or "very poor".

The thickness of each of regions "a" and "b" were determined as follows. For each sample, a cross-section about 100 microns in thickness was taken in each region "a" and "b" with a diamond wet saw. Each cross-section was immersed in liquid having a refractive index of 1.498 an examined with a polarizing microscope equipped with a digital camera. Photomicrographs of the cross-sections were made with a Diagnostic Instruments Model 3.2.0 digital camera and the thickness of the coating on the substrate was determined using Spot software, version 3.5.6.2. Upon immersion in the refractive index liquid, coating (B) of Sample 4(B) separated from the cross-section. The separated coating (B) was cut into strips and the thickness of the strips was measured on edge, in air, using the aforementioned digital camera equipped polarizing microscope and Spot software. The results of these analyses are listed in Table IV.

TABLE IV

| Sample No. | Region | Degree of Alignment | Thickness (microns) |
| --- | --- | --- | --- |
| 1 | a | very poor | 34 ± 2 |
| 1 | b | poor | 22 ± 1 |
| 2 | a | good | 16 ± 1 |
| 2 | b | poor | 27 ± 1 |
| 3 | a | good | 15 ± 1 |
| 3 | b | good | 15 ± 1 |
| 4A | a | good | 7 ± 1 |
| 4A | b | good | 7 ± 1 |
| 4B | a | good | 16 ± 1 |
| 4B | b | good | 14 ± 1 |

Example 4

A substrate having an alignment facility comprising an at least partial coating comprising an at least partially ordered liquid crystal material was prepared by an overmolding process as follows.

Part A

Each of the liquid crystal monomers listed in Table V (which are described above in Example 1) were added to a beaker in the order listed with stirring:

TABLE V

| Liquid Crystal Monomer | Amount (g) |
| --- | --- |
| RM 23 | 3.25 |
| RM 257 | 3.25 |
| RM 82 | 3.25 |
| RM 105 | 3.25 |

Anisole (7.0 grams) was then added to the beaker and the resulting mixture was heated to 60° C. and stirred until the solids were dissolved as determined by visual observation. The resulting liquid crystal monomer solution had 65 percent solids. Essentially all of the solvent was thereafter removed by sparging with air for 2 hours to produce the overmolding solution.

Part B

A six-base lens prepared of CR-39® monomer was cleaned following the procedure of Part B of Example 1 except that the lens was dried in an oven at 100° C. for 10 minutes prior to treatment with oxygen plasma.

Part C

The procedure of Part C of Example 1 was followed to form an orientation facility comprising an least partially ordered coating comprising a photo-orientable polymer network on the surface of the lens and on the surface of a glass mold, except that a 90 second exposure to the linearly polarized ultraviolet light was used to at least partially order the photo-orientable polymer network.

Part D

After forming the orientation facilities as described in Step 3, the mold was positioned on a flat surface with the orientation facility facing up. An amount of the overmolding solution sufficient to cover the mold surface was poured into the center of the mold. Teflon® circular sleeves were placed on the edges of the mold for use as spacers. The lens was positioned adjacent the mold such that the orientation facility on the lens contacted the overmolding solution, and the overmolding solution spread out to fill the region between the lens and mold. Clamps were applied to form an assembly that was placed in an oven at 45° C. for 30 minutes to permit the liquid crystal material to at least partially align with the orientation facilities. Thereafter, the assembly was placed on the ultraviolet conveyor curing line described in Part C of Example 1. After curing, the coated lens was released from the mold. Examination of the coated lens using the cross-polar films described above in Part B of Example 1, demonstrated good alignment.

The thickness of the overmolded coating was determined as follows. A cross-section was obtained from the lens in an area midway between the center and the outer edge of the lens. The cross-section was coated with a 1.550 refractive index liquid, placed on a microscope slide and covered with a cover slip. Measurements of the coating thickness were then taken using a Leitz polarized light microscope and a Spot digital camera. Based on these measurements, the coating was determined to have a thickness ranging from 61+/−5 microns to 65+/−5 microns.

It is to be understood that the present description and examples illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments or examples disclosed, but is intended to cover modifications that are within the spirit and scope of the invention, as defined by the appended claims.

We claim:

1. An ophthalmic element comprising:
   an ophthalmic substrate; and
   an alignment facility for an optical dye connected to an ophthalmic substrate, the alignment facility comprising,
      a first coating connected to the ophthalmic substrate, the first coating comprising an ordered liquid crystal material having a first general direction, and
      an additional coating connected to the first coating, the additional coating comprising an ordered liquid crystal material having a second general direction that is parallel to the first general direction,
      wherein said ordered liquid crystal material of said first coating is set, and said ordered liquid crystal material of said additional coating is set,
      wherein a sum of a thickness of the first coating and a thickness of the additional coating ranges from 10 microns to 50 microns, and
   wherein the ophthalmic substrate is an organic ophthalmic substrate.

2. The ophthalmic element of claim 1 wherein the ophthalmic substrate is chosen from corrective lenses, non-corrective lenses, partially formed lenses, and lens blanks.

3. The ophthalmic element of claim 1 wherein the ophthalmic substrate is chosen from untinted, tinted, linearly polarizing, photochromic, or tinted-photochromic ophthalmic substrates.

4. The ophthalmic element of claim 1 wherein the alignment facility comprises a plurality of additional coatings.

5. The ophthalmic element of claim 1 further comprising an orientation facility interposed between the coating of the alignment facility and the ophthalmic substrate, the orientation facility comprising a coating comprising an ordered alignment medium, wherein the ordered alignment medium is chosen from photo-orientation materials and rubbed-orientation materials.

6. The ophthalmic element of claim 5 wherein the orientation facility has a plurality of regions and each of the plurality of regions has a general direction that is the same or different from the remaining regions and together form a design or pattern.

7. The ophthalmic element of claim 1 wherein an optical dye is in contact with the alignment facility.

8. An ophthalmic element comprising:
   an ophthalmic substrate; and
   an alignment facility for an optical dye connected to an ophthalmic substrate, the alignment facility comprising,
   a first coating connected to the ophthalmic substrate, the first coating comprising an ordered liquid crystal material having a first general direction, and
   an additional coating connected to the first coating, the additional coating comprising an ordered liquid crystal material having a second general direction that is parallel to the first general direction,
   wherein a sum of a thickness of the first coating and a thickness of the additional coating ranges from 10 microns to 50 microns, and
   the ophthalmic substrate is an organic ophthalmic substrate.

* * * * *